Oct. 24, 1950  J. T. DAVIDSON ET AL  2,526,734
ACCOUNTING MACHINE
Original Filed March 3, 1944  13 Sheets-Sheet 1

JOHN T. DAVIDSON
PAUL H. WILLIAMS
JESSE R. GANGER &
JAMES H. CRAWFORD
INVENTORS

BY Earl Benst
THEIR ATTORNEY

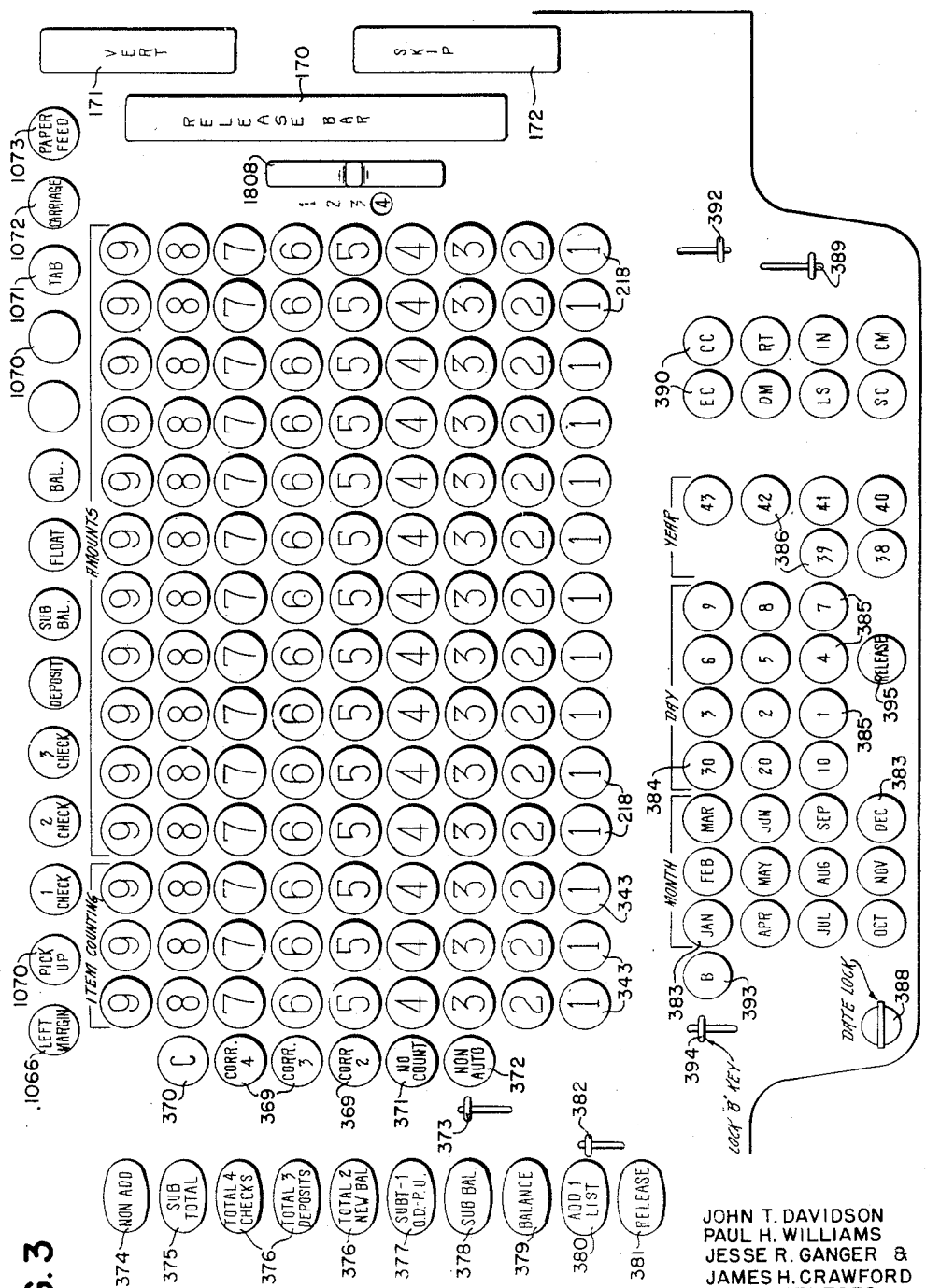

Oct. 24, 1950    J. T. DAVIDSON ET AL    2,526,734
ACCOUNTING MACHINE
Original Filed March 3, 1944    13 Sheets-Sheet 3

JOHN T. DAVIDSON
PAUL H. WILLIAMS
JESSE R. GANGER &
JAMES H. CRAWFORD
*INVENTORS*
BY
*THEIR ATTORNEY*

Oct. 24, 1950     J. T. DAVIDSON ET AL     2,526,734
ACCOUNTING MACHINE
Original Filed March 3, 1944     13 Sheets-Sheet 4
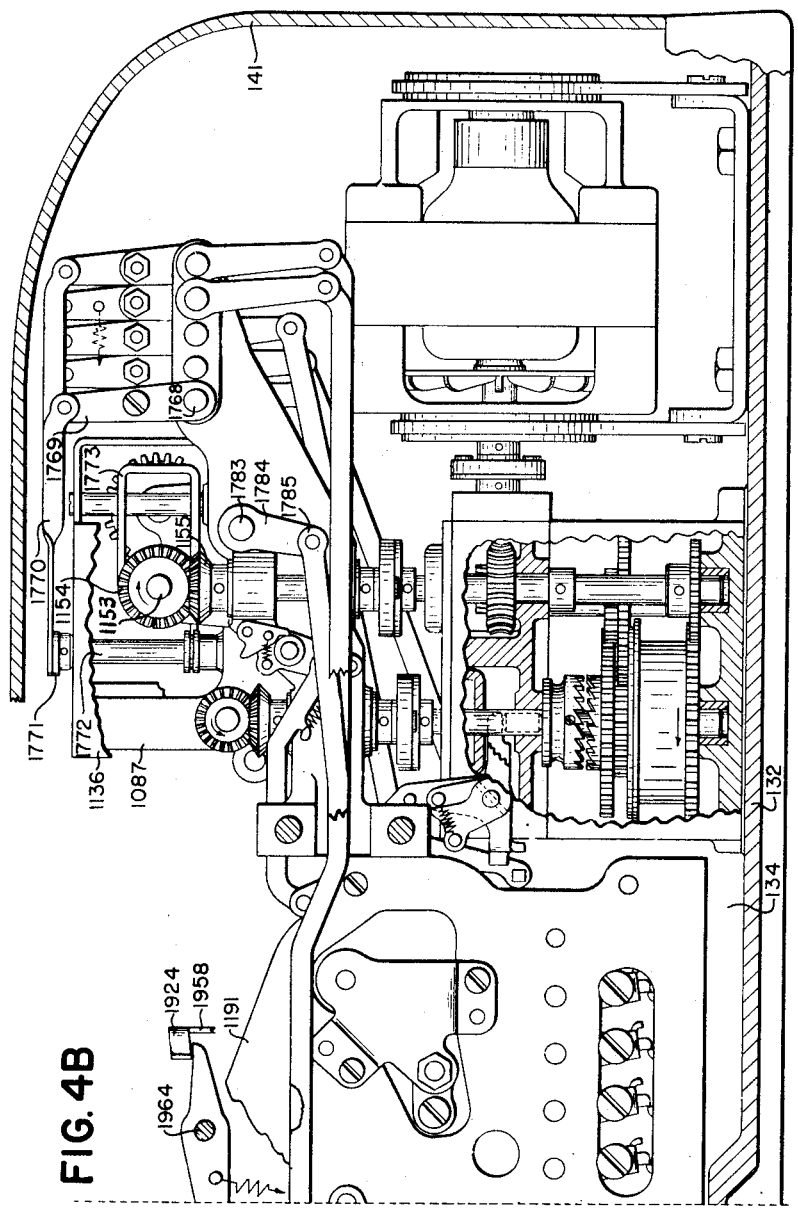
JOHN T. DAVIDSON
PAUL H. WILLIAMS
JESSE R. GANGER &
JAMES H. CRAWFORD
*INVENTORS*
BY *Earl Benst*
THEIR ATTORNEY Oct. 24, 1950  J. T. DAVIDSON ET AL  2,526,734
ACCOUNTING MACHINE
Original Filed March 3, 1944  13 Sheets-Sheet 5
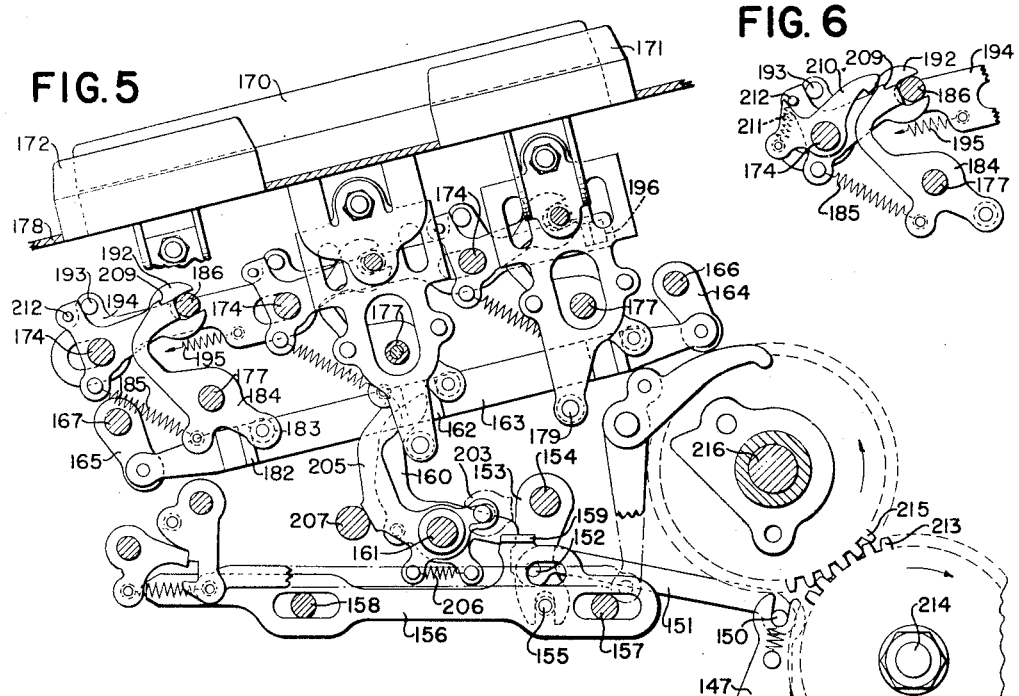
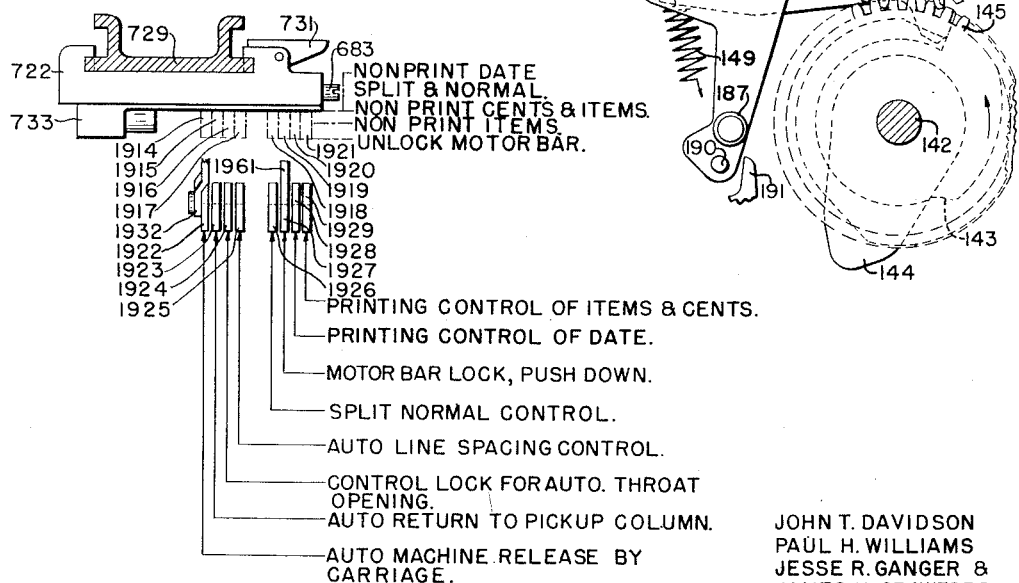
JOHN T. DAVIDSON
PAUL H. WILLIAMS
JESSE R. GANGER &
JAMES H. CRAWFORD
INVENTORS
BY Pearl Beust
THEIR ATTORNEY Oct. 24, 1950 J. T. DAVIDSON ET AL 2,526,734
ACCOUNTING MACHINE
Original Filed March 3, 1944 13 Sheets-Sheet 6
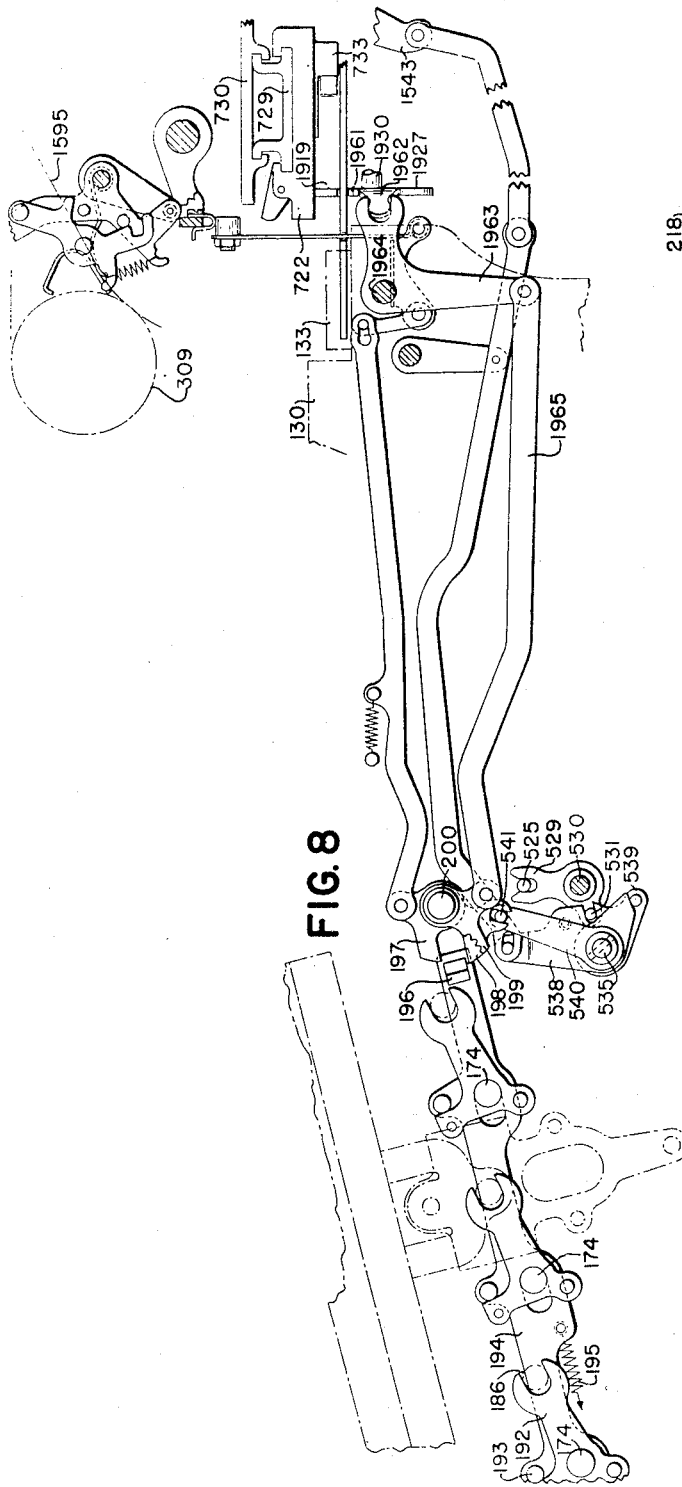
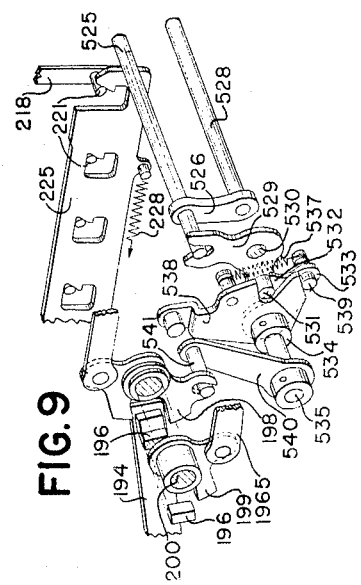
JOHN T. DAVIDSON
PAUL H. WILLIAMS
JESSE R. GANGER &
JAMES H. CRAWFORD
INVENTORS
BY Earl Benit
THEIR ATTORNEY

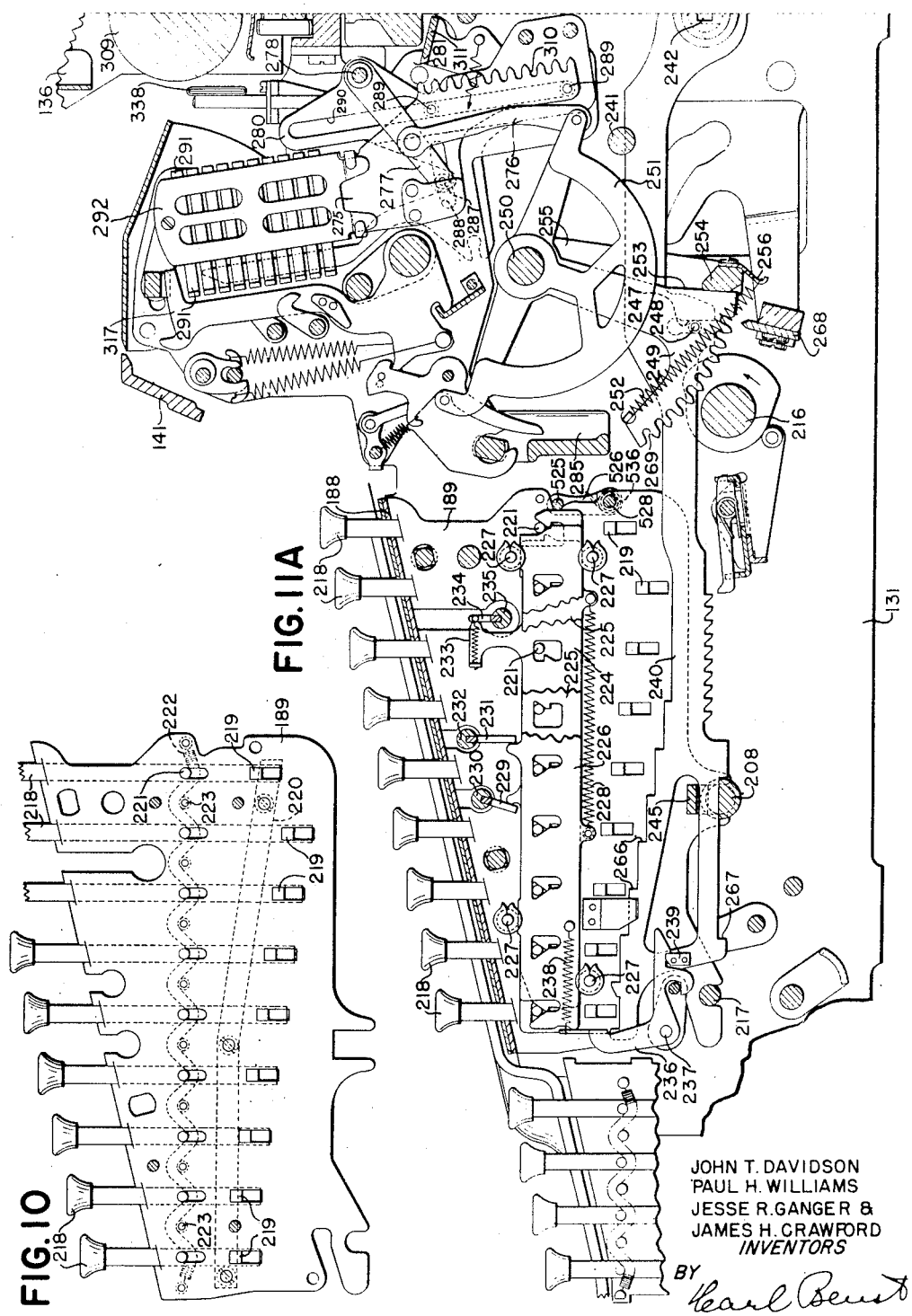

Oct. 24, 1950
J. T. DAVIDSON ET AL
2,526,734
ACCOUNTING MACHINE
Original Filed March 3, 1944
13 Sheets-Sheet 8
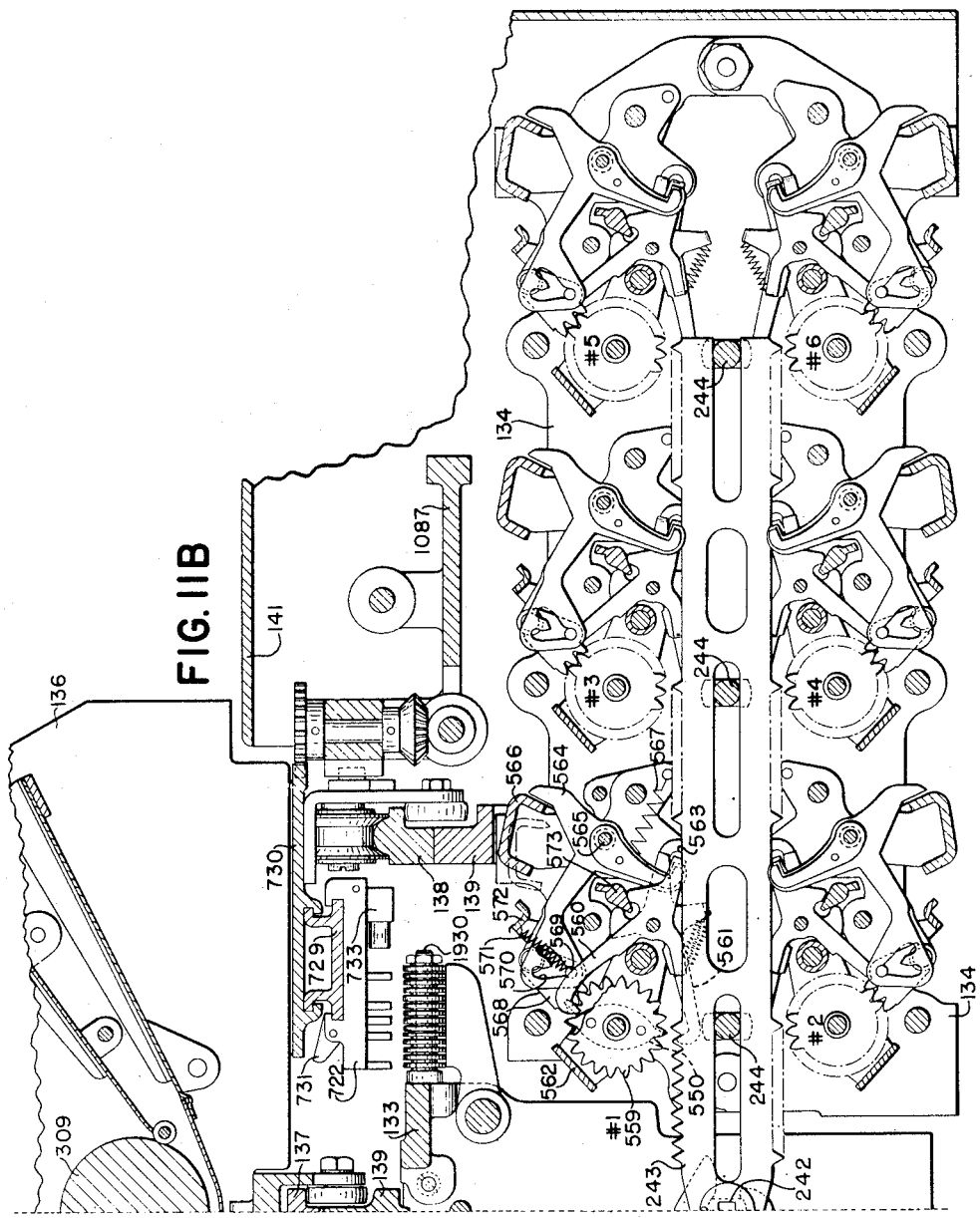
JOHN T. DAVIDSON
PAUL H. WILLIAMS
JESSE R. GANGER &
JAMES H. CRAWFORD
*INVENTORS*
BY Carl Benst
THEIR ATTORNEY

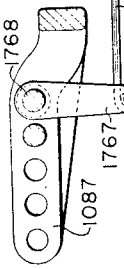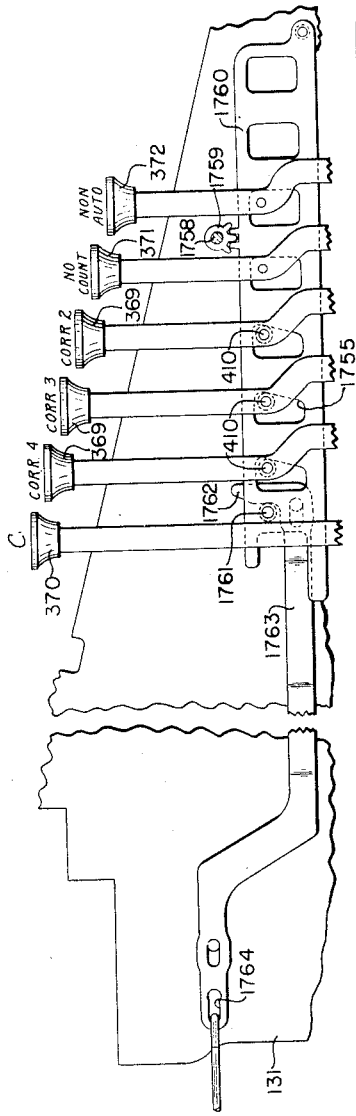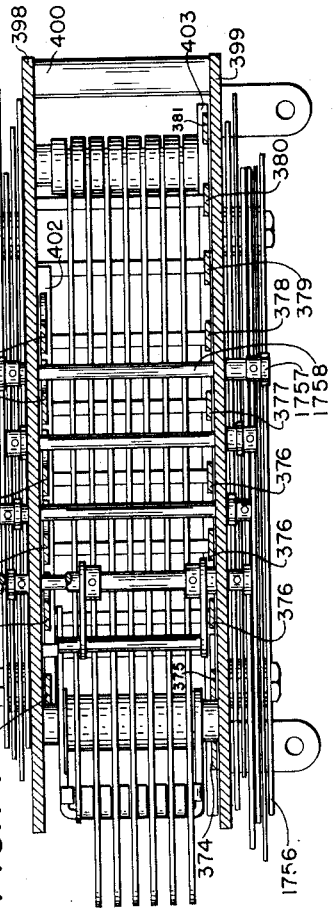

Oct. 24, 1950   J. T. DAVIDSON ET AL   2,526,734
ACCOUNTING MACHINE
Original Filed March 3, 1944   13 Sheets-Sheet 10

JOHN T. DAVIDSON
PAUL H. WILLIAMS
JESSE R. GANGER &
JAMES H. CRAWFORD
*INVENTORS*

BY *Earl Benst*

THEIR ATTORNEY

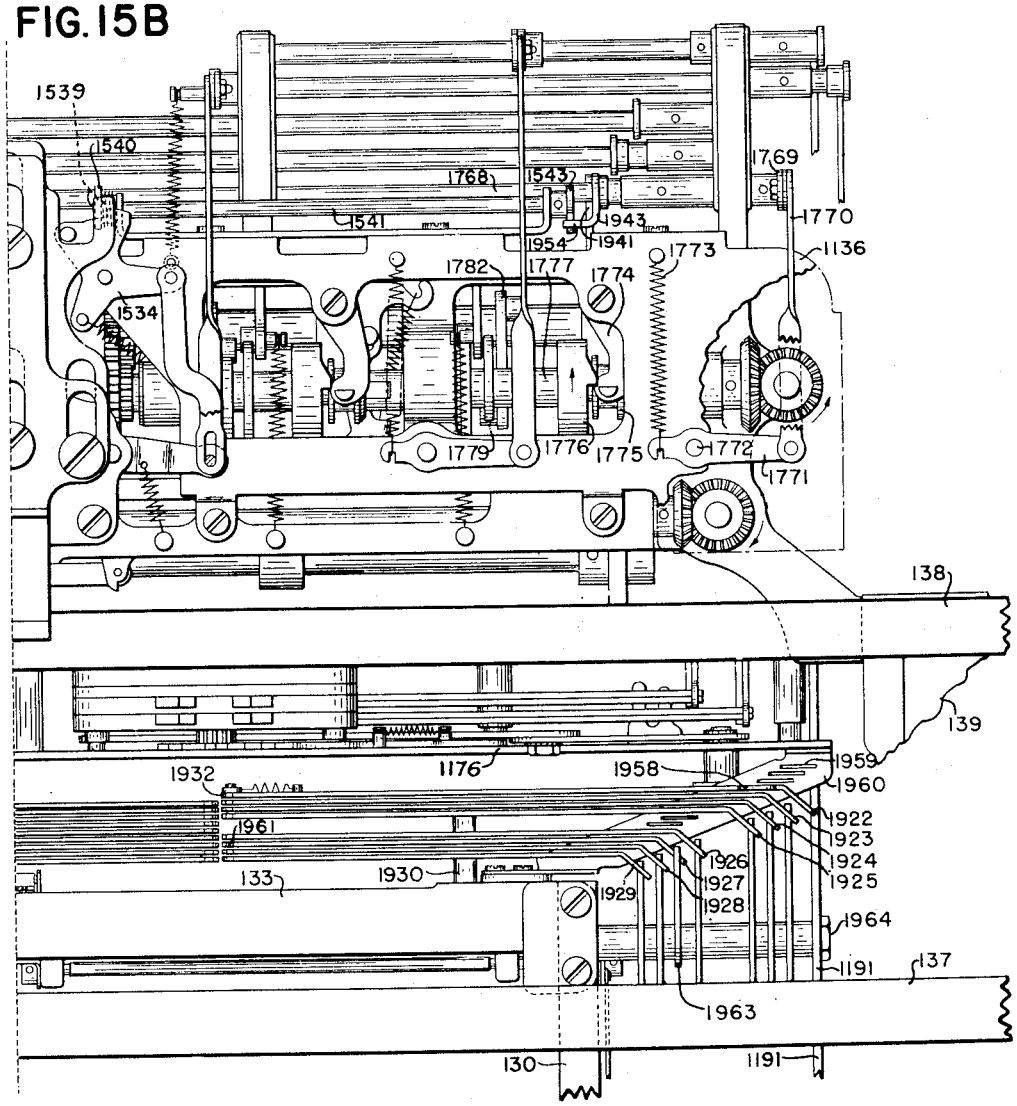

Oct. 24, 1950   J. T. DAVIDSON ET AL   2,526,734
ACCOUNTING MACHINE

Original Filed March 3, 1944   13 Sheets-Sheet 12

JOHN T. DAVIDSON
PAUL H. WILLIAMS
JESSE R. GANGER &
JAMES H. CRAWFORD
INVENTORS

BY Carl Benst
THEIR ATTORNEY

Oct. 24, 1950     J. T. DAVIDSON ET AL     2,526,734
ACCOUNTING MACHINE
Original Filed March 3, 1944     13 Sheets-Sheet 13
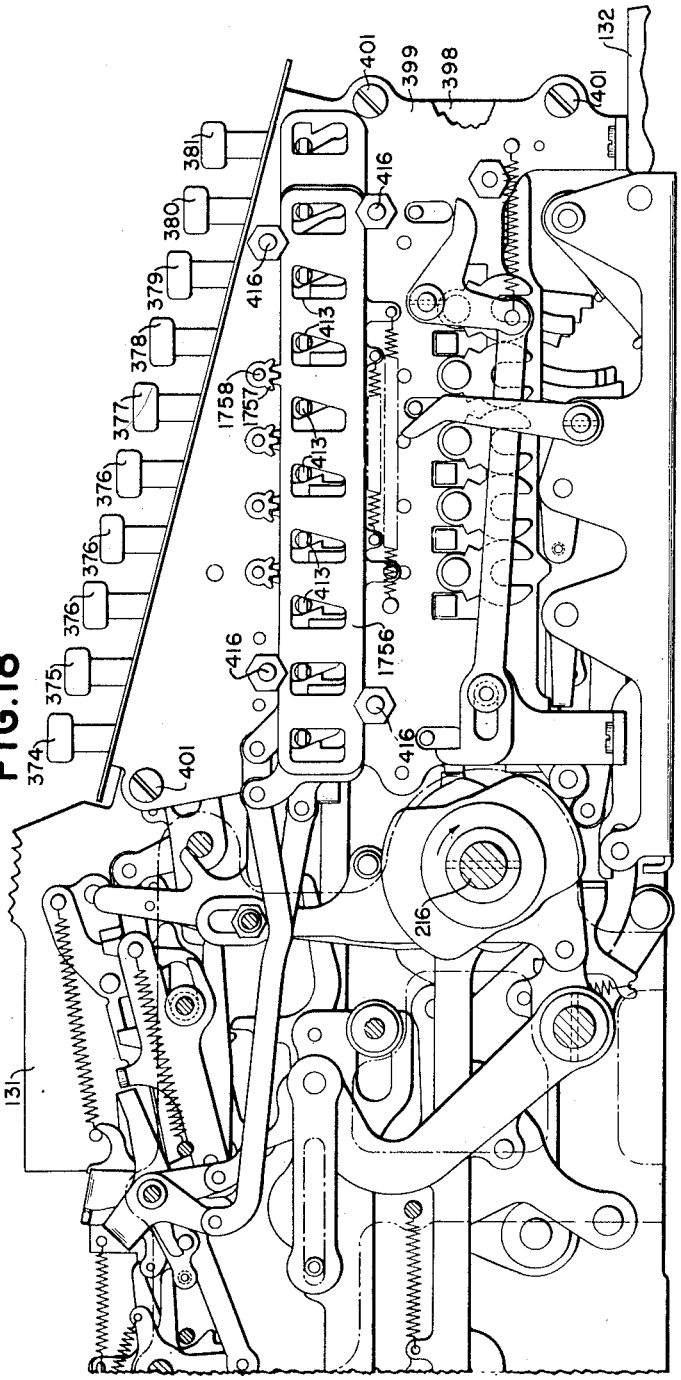
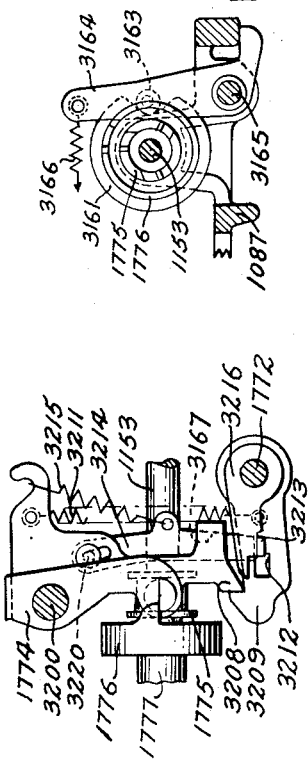
JOHN T. DAVIDSON
PAUL H. WILLIAMS
JESSE R. GANGER &
JAMES H. CRAWFORD
*INVENTORS*
BY *Earl Benst*
THEIR ATTORNEY Patented Oct. 24, 1950

2,526,734

UNITED STATES PATENT OFFICE 2,526,734

ACCOUNTING MACHINE

John T. Davidson, Paul H. Williams, Jesse R. Ganger, and James H. Crawford, Dayton, Ohio, assignors to The National Cash Register Company, Dayton, Ohio, a corporation of Maryland Original application March 3, 1944, Serial No. 524,846. Divided and this application December 21, 1945, Serial No. 636,357

5 Claims. (Cl. 235—60.47)

This application is a division of the application of John T. Davidson et al., Serial No. 524,846, filed March 3, 1944, now Patent No. 2,442,402.

The present invention is directed to improvements in accounting machines and the like and is particularly directed to improvements in the opertaing or cycling mechanism of such machines and the means for controlling said mechanism.

The present invention is incorporated in an improved type of accounting or bookkeeping machine for use in connection with the many complex business systems employed by modern business establishments in the keeping of accurate and permanent records of all the transactions, in which they participate.

The particular machine chosen to illustrate the present invention is arranged for use by banking establishments in connection with the accounting or bookkeeping problems involved in the balancing of individual checking accounts. However, it is not the desire to limit the features of this invention to any particular machine or to any particular business system, as the versatility and flexibility of such a machine admirably adapt it for use in the solution of practically all accounting problems encountered in connection with complex present-day business systems.

Many of the basic principles of the machine embodying the present invention are disclosed in the following United States patents: Letters Patent of the United States Nos. 1,197,278 and 1,203,863, issued, respectively, September 5, 1916, and November 7, 1916, to Halcolm Ellis; No. 1,819,084, issued August 18, 1931, to Emil John Ens; No. 2,038, 717, issued April 28, 1936, to Raymond A. Christian; No. 2,079,355, issued May 4, 1937, to Charles L. Lee; No. 2,181,975, issued December 5, 1939, to Charles L. Lee; No. 2,189,851, issued February 13, 1940, to Paul H. Williams et al.; and Patent No. 2,217,221, issued October 8, 1940, to Jesse R. Ganger. Reference may be had to the above patents for the details of construction of the basic portions of the machine, which are described herein only in a general way.

Broadly, it is an object of this invention to provide an accounting machine for use in connection with the complex business systems of present-day business establishments.

Another object is the provision of an improved type of front-feed traveling carriage having hydraulic means for driving it in tabulating and return directions, said hydraulic means operating independently of the main operating means for the machine proper.

Another object is to supply means for automatically initiating operation of the machine, said means being under the control of certain control elements and/or under the control of the traveling carriage in preselected columnar positions thereof.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 3 is a diagrammatic plan view of the keyboard of the machine of this invention.

Figure 4A:
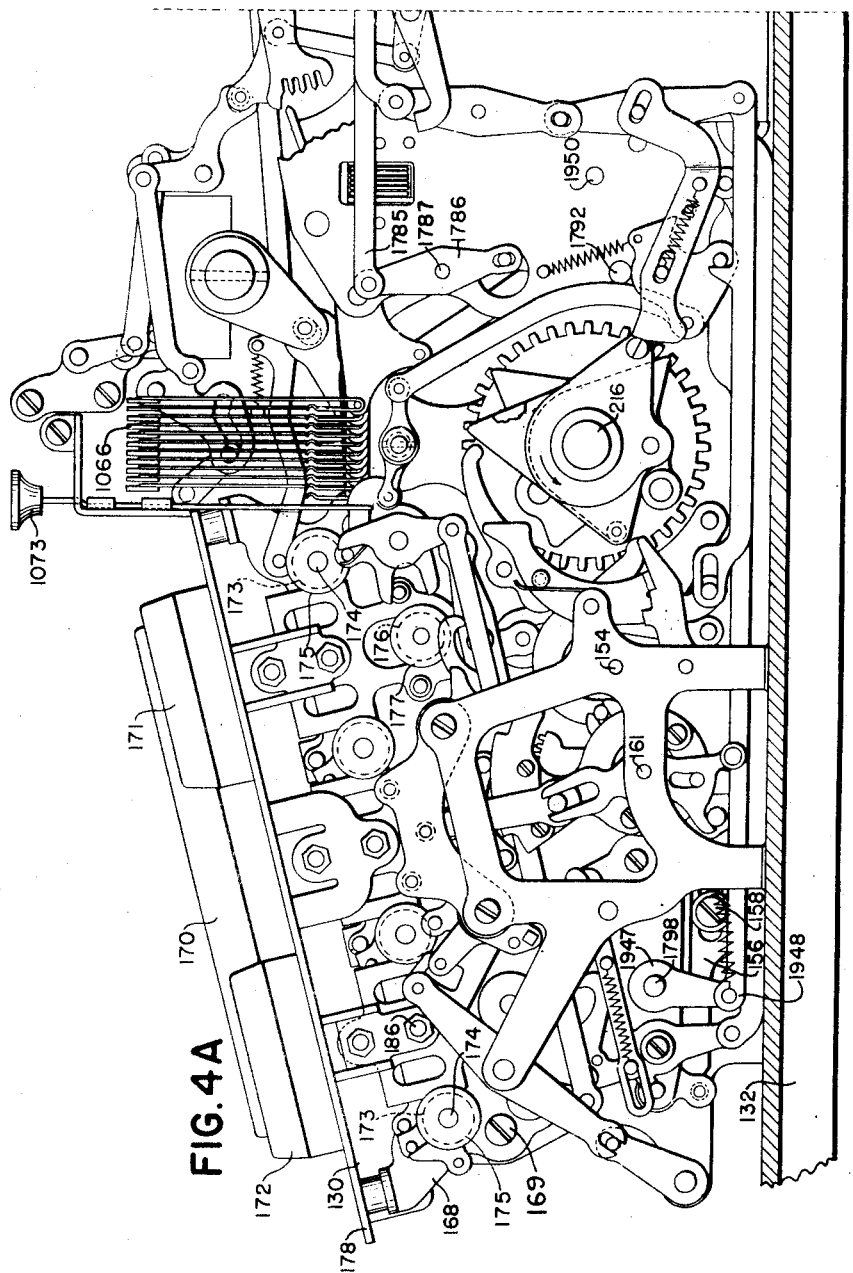

Figs. 4A and 4B together constitute a side elevation of the machine as observed from its right side.

Fig. 5 is a right side elevation of the machine releasing mechanism.

Fig. 6 is a detail view of the non-repeat mechanism for one of the release bars.

Fig. 7 is a cross-sectional view of a portion of the mechanism for controlling the various functions of the machine by means of the traveling carriage in selected columnar positions thereof.

Fig. 8 is a right side elevation showing in particular the mechanism for locking the machine releasing mechanism against operation.

Fig. 9 is a perspective view showing in detail the mechanism for locking the machine against operation when an amount key is partially depressed and for closing the front-feed throat when an amount key or an item counting key is depressed.

Fig. 10 is a detail view showing the manner in which the amount keys are mounted in the keyboard framework.

Figs. 11A and 11B together constitute a longitudinal cross-sectional view of the entire machine, taken just to the right of one of the amount banks, showing the actuator mechanism, the printing mechanism, and the corresponding wheels of the six totalizers associated with said amount bank.

Fig. 12 is a left side elevation showing the manner in which the three correction keys initiate operation of the machine.

Fig. 13 is a facsimile of a fragmentary portion of a statement slip illustrating one use of the machine of this invention.

Fig. 14 is a top plane view of the totalizer control slides for controlling the functions of the various totalizers.

Figure 15A:
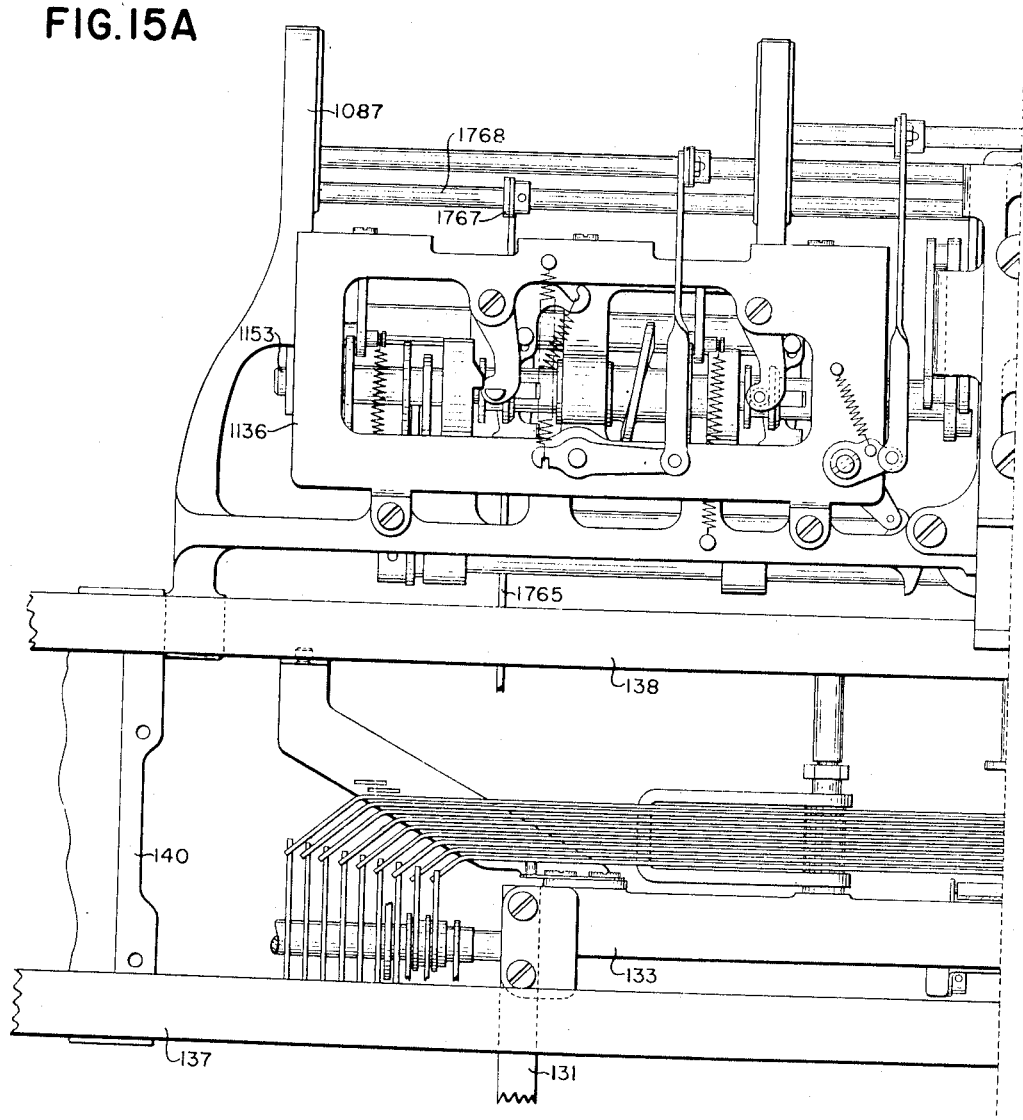

Figs. 15A and 15B together constitute a top plan view of the operating mechanism for the traveling carriage and of the sensing mechanism controlled by control blocks mounted in columnar positions on said traveling carriage for controlling the various functions of the machine.

Figure 16:
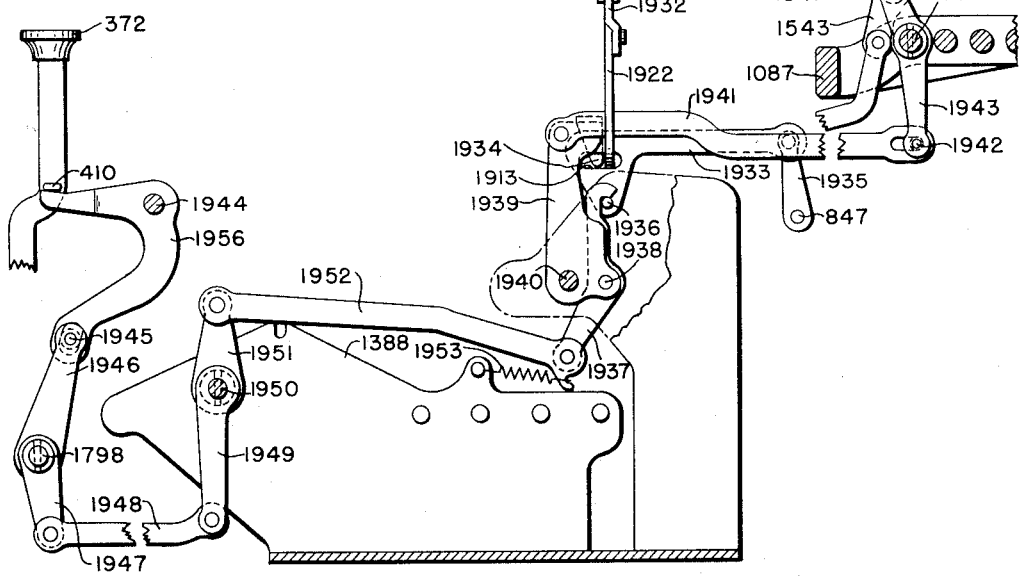

Fig. 16 is a right side elevation of the mechanism controlled by the balance totalizer and by the Non-Auto key for rendering the automatic machine releasing mechanism inoperative.

Figure 17:
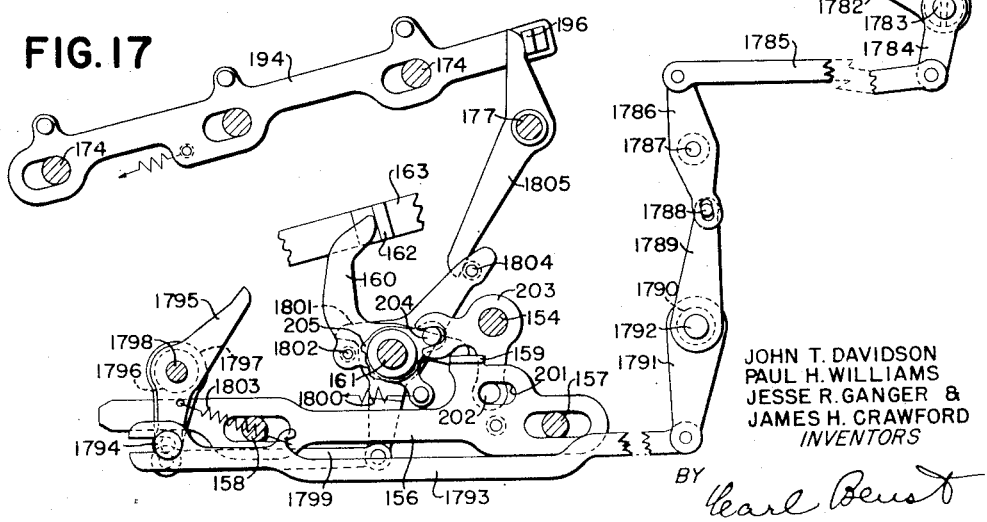

Fig. 17 is a detail view of the automatic machine releasing mechanism, which is controlled by certain control keys and by the traveling carriage in columnar positions thereof.

Fig. 18 is a left side elevation of a portion of the machine, showing in particular the mechanisms for controlling the functions of the various totalizers.

Fig. 19 is a plan view of the clutch mechanism utilized in conjunction with the automatic machine release structure.

Fig. 20 is a detail view of the homing mechanism for the clutch mechanism, shown in Fig. 19.

GENERAL DESCRIPTION

The mechanism of the machine chosen to illustrate the present invention is driven by a conventional type of electric motor which may be released for operation either by any one of three release bars, including a main release bar and two auxiliary bars, or by any one of a plurality of so-called motorized control keys, or automatically by means of the traveling carriage in pre-selected columnar positions thereof. The main operating motor is of the semi-continuously running type, there being an automatic shut-off device provided for breaking the current to the motor in case said motor is left running and the machine is not operated over a certain period of time. Release of the machine for operation restores the automatic shut-off mechanism to initial position.

Instead of the convention type of oscillating cam shaft usually found in machines of this type, the present machine is provided with a rotary cam shaft, which makes one revolution each machine operation to drive the different mechanisms of the machine. Depression of any one of the three motor bars, or any of the various motorized control keys, causes the main shaft to be clutched to the operating motor, which drives said shaft through one revolution of movement, after which said main shaft is automatically declutched from the motor mechanism.

After the automatic shut-off mechanism has functioned to stop operation of the motor, depression of any one of the starting bars or any one of the motorized control keys, in addition to actuating the clutch mechanism, as explained above, simultaneously operates the switch mechanism to energize the operating motor.

The machine of the present invention is equipped with a laterally shiftable traveling carriage, which is driven in both tabulating and return directions by a non-positive hydraulic driving mechanism similar in many respects to that disclosed in the Ganger Patent No. 2,217,221. The hydraulic mechanism for the traveling carriage is driven by an independent motor, which is actuated by the same switch mechanism which controls the main motor for driving the machine proper.

The independent motor for the traveling carriage likewise, through a positive connection, drives an auxiliary cam shaft for controlling the various functions of the traveling carriage.

The auxiliary cam shaft for the carriage mechanism drives a plurality of clutch driven members for a series of clutches which are actuated under the control of the machine controlling mechanisms to initiate the various functions of the traveling carriage and in some cases of the machine proper. These functions include the opening and closing of the front-feed throat of the traveling carriage, the line-spacing of the platen roll, the reversing of the lateral movement of the traveling carriage, the depression of the tabulating stop plungers to release the traveling carriage for either tabulating or return movement, and the initiating of automatic releasing of the machine for operation.

The automatic machine releasing mechanism, in addition to being actuated by the traveling carriage, as stated above, may likewise be actuated under the control of the motorized control keys for effecting automatic operations of the machine.

A manipulative member is provided for rendering inoperative the automatic machine releasing mechanism.

The machine embodying the present invention, in the form illustrated, is provided with six adding and subtracting totalizers mounted in vertical pairs at the rear of the machine, as is the usual practice in machines of this type.

It is not the desire to limit this machine to any particular number of totalizers, as this is a matter of choice, and the number of totalizers may be increased or decreased at will to meet the requirements of the business system to which the machine is being applied.

In the present adaptation, one of the add-subtract totalizers is used as a balance totalizer, often referred to as a crossfooter, and another totalizer is used in conjunction with said balance totalizer and is maintained constantly in complementary relationship thereto so that a positive recording of the amount of an overdraft, often referred to as a true negative balance, may be obtained at any time by simply reading or resetting this complementary totalizer, which will be referred to hereinafter as the overdraft totalizer. This arrangement of the balance totalizer and the overdraft totalizer permits all operations, including overdraft operations, to be performer in one cycle of operation of the machine, a decided advantage, as in former machines it was necessary to utilize three cycles of operation of the machine in overdraft operations in order to transpose the negative amount of the overdraft to a positive amount and record this amount.

Another one of the totalizers is used as an item counter and may be used in conjunction with the balance totalizer or any of the other totalizers, for counting any particular item. The other three totalizers of the machine may be used in any manner desired, depending upon the particular business system to which the machine is being applied.

The wheels of the six totalizers are adapted to be engaged with corresponding actuator racks, there being one such rack for each denominational order of the machine, said racks being controlled in adding and subtracting operations by means of corresponding denominational rows of amount keys mounted in the main keyboard of the machine.

In adding and subtracting operations, depressed amount keys cause the corresponding actuator racks to be positioned in agreement therewith and transmit this positioning to the wheels of the selected totalizer or totalizers to enter therein the amount set up on the keyboard. One of the advantages of the use of the type of actuators employed in this machine is that any or all of the totalizers may be simultaneously engaged with the actuators in adding or subtracting operations so that the amount set up on the keyboard may be entered in any desired number of the totalizers. In this machine, as in all other machines having a single set of actuators, it is possible to perform a total or a sub-total recording operation in only one totalizer at a time. However, such total or sub-total may be simultaneously added to or subtracted from any of the other totalizers.

One of the unique features of the present machine is that any totalizer may be selected and conditioned for any type of operation, including non-adding, adding, subtracting, total recording, and sub-total recording, either by means of the traveling carriage in predetermined columnar positions thereof, or by a row of control keys located on the left-hand side of the main keyboard. With this type of mechanism, it is possible to arrange the control mechanism on the traveling carriage so that a complete series of operations, involving any number of the totalizers, may be performed without the operator's having to bother with the selection of said totalizers, which makes for speed and efficiency in handling the accounting problems in connection with complex business systems.

As previously explained, the balance totalizer and the overdraft totalizer are always in complementary agreement with each other. As long as the balance totalizer is in a positive condition, it will be selected in sub-balance and balance operations for recording the sub-balance or the balance. However, when the balance totalizer becomes overdrawn, mechanism, which functions automatically, causes the overdraft totalizer to be selected for sub-balance or balance recording operations in order to record a positive amount or true negative balance of the overdraft without any further computation involving multiple cycles of the machine operating mechanisms. In balance of overdraft operations, the amount of the overdraft cleared from the overdraft totalizer is simultaneously added into the balance totalizer to zeroize said balance totalizer. In normal balance operations, when the balance totalizer is in a positive condition, the amount cleared from said balance totalizer is simultaneously subtracted from the overdraft totalizer to zeroize it.

In balance and sub-balance operations, the wheels of the selected totalizer are engaged with the actuator prior to their initial movements and are turned in a subtractive or reverse direction by said actuators to zero position, to position said actuators commensurate with the value of the amount standing on said selected totalizer wheels. In balance operations, the wheels of the selected totalizer are disengaged from the actuators prior to their return forward movement and, as a result, remain zeroized, while in sub-balance operations said wheels remain in engagement with said actuators during their return movement and are consequently restored to their original positions.

The amount actuators are connected to corresponding type carriers and position said type carriers in relation to the position of said actuators, either under the control of the amount keys or under control of the selected totalizer wheels in sub-total and total recording operations, whereupon functioning of the impression mechanism causes the amount to be recorded upon the record material supported by the platen roll of the traveling carriage. Likewise, the selecting and conditioning mechanism for the totalizers controls the positioning of corresponding symbol type carriers to cause a character symbolic of the type of operation being performed to be printed adjacent the amount on the record material.

In addition to the keys outlined above, the main keyboard contains a row of correction keys for making corrections in the various totalizers. This row of keys also includes a Non-Count key for rendering the item counter inoperative and a Non-Automatic key for preventing operation of the automatic machine releasing mechanism under influence of the traveling carriage in preselected columnar positions thereof. The row of control keys includes a Release key for releasing any depressed amount and/or control keys.

The mechanism outlined in general above, which is pertinent to the present invention, will be described in detail in the ensuing pages.

DETAILED DESCRIPTION

Framework

Figure 1:
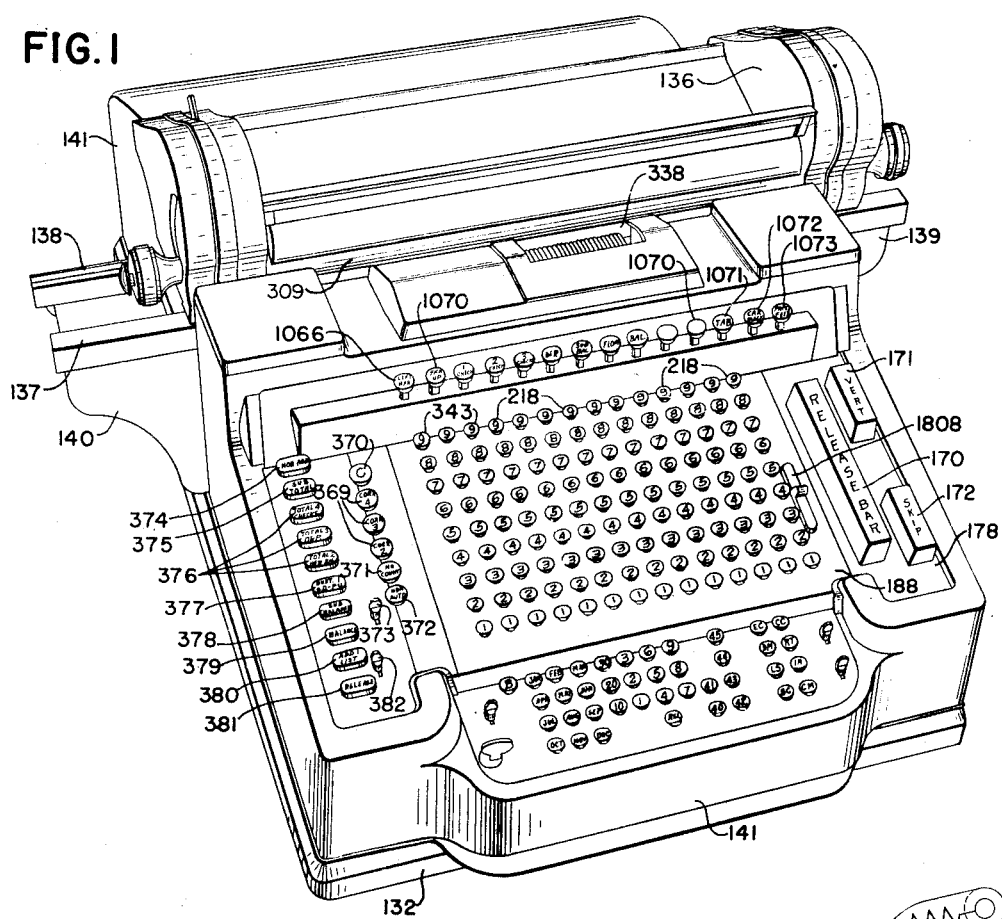
Fig. 1 is a perspective view of the complete machine.

The main framework of the machine embodying this invention comprises a right frame 130 (Figs. 4A, 4B, 15A, and 15B) and a left frame 131 (Figs. 11A and 15A) secured to a machine base 132, said right and left frames being secured in fixed relationship to each other by a cross-frame 133 (Figs. 11B, 15A, and 15B) and various other cross-frames, rods, and shafts. The totalizers of the machine are mounted in a framework 134 (Fig. 11B) comprising right and left frames and various cross-frames, rods, and shafts, said framework 134 being secured to the machine base 132 (Figs. 1, 4A, and 4B).

The present machine is provided with a laterally shiftable traveling carriage 136 (Figs. 1, 11A, and 11B), which is supported for shifting movement on rails 137 and 138 (see also Figs. 15A and 15B) in turn secured to carriage support frames 139 and 140 secured to the machine base 132. The rail 137 is also secured to the right and left frames 130 and 131 and aids in supporting said frames in proper spaced relationship to each other.

The mechanism of the machine is enclosed in a suitable cabinet or case 141 (Figs. 1 and 4B), which is in turn secured to the machine base 132.

Operating mechanism

The main mechanism of the machine is driven by a conventional type of electric motor, not shown, but disclosed in one or more of the patents referred to at the beginning of this specification, said motor being secured to the lower surface of the machine base. The electric motor is geared to and drives a clutch driving member (not shown) rotatably supported on a shaft 142 (Fig. 5) journaled in the motor framework. Also rotatably mounted on the shaft 142 is a clutch driven member 143 having integral therewith a cam 144 and a gear 145. The clutch driven member 143 has thereon an abrupt shoulder, which is normally engaged by the nose of a clutch control lever 146 secured to a companion lever 147, both of said levers being free on a stud 148 secured in the motor framework. A relatively strong spring 149 is tensioned to urge the levers 146 and 147 in a counter-clockwise or disengaging direction.

An upward extension of the lever 147 has therein a slot which embraces a stud 150 in one end of a link 151, the other end of which is pivoted at 152 to an arm 153 free on a stud 154 secured in the right frame 130. The lower end of the arm 153 is bifurcated to straddle a stud 155 in a release slide 156 shiftably mounted by means of parallel slots therein in cooperation with studs 157 and 158 secured in the right frame 130. The slide 156 (Figs. 5 and 17) has a bent-over ear 159 engaged by a shoulder on a release latch 160 free on a stud 161 secured in the right frame 130. A finger-like upward extension of the latch 160 cooperates with one surface of an extension of a block 162 secured to a release link 163, opposite ends of which are pivoted, respectively, to similar arms 164 and 165 free on studs 166 and 167 secured in a plate 168 (Fig. 4A) in turn secured to the main frame 130 by screws 169.

The release link 163 (Fig. 5) is common to and cooperates with the three starting bars with which the machine is equipped, including a main starting or Release bar 170, a Vertical Feed release bar 171, and a Skip tabulating release bar 172. The three release bars are depressibly mounted on the plate 168 (Fig. 4A) by means of parallel side edges on the release bars in cooperation with four shoulder bushings 173 mounted on four similar studs 174 secured in said plate 168. The starting bars are retained against lateral displacement by means of washers 175 (Fig. 4A) free on the studs 174 and secured against lateral displacement on said studs by means of spring retaining clips which engage annular grooves in the ends of said studs. The release bars 170, 171, and 172 are slotted to embrace the reduced portions of shoulder bushings 176 free on studs 177 secured in the plate 168, said release bars being retained on the shoulder bushings 176 by washers and retaining clips similar to those used on the studs 174.

The upper portions of the release bars 170, 171, and 172 are removably connected to the lower parts of said release bars, said upper parts including touch blocks which extend through corresponding openings in a release bar cover plate 178 (Figs. 4A and 5) secured to bent-over ears of the plate 168. The top surface of the cover plate 178 is flush with and forms an extension of the top surface of the amount keyboard top plate, as shown in Fig. 1. The extreme lower ends of the release bars 170, 171, and 172 have therein studs 179, which support rollers which in turn engage corresponding slots in the plate 168 to further assist in mounting the release bars for shifting movement on said plate 168. The studs 179 cooperate with fingers on locking plates (not shown), said locking plates serving to lock any two of the release bars against depression when the other release bar is depressed, in the well-known manner.

Each of the release bars 170, 171, and 172 cooperates with the release link 163 (Fig. 5) in exactly the same manner; therefore it is believed that the description of the manner in which one of these bars—for example, the Skip release bar 172—cooperates with said link will be sufficient.

The release link 163 has secured thereto a block 182 similar to the block 162 having a right-angled extension which cooperates with a stud 183 in a lever 184 pivoted on the left-hand one of the studs 177. A spring 185 urges the lever 184 clockwise to normally maintain a hook-shaped extension on its upper end in contact with a stud 186 in the Skip release bar 172.

Depression of the release bar 172 moves the stud 186 beneath the hook-shaped extension of the lever 184 to release said lever to the action of the spring 185, which immediately urges said lever clockwise, which, through the stud 183 and the block 182, carries the link 163 forwardly or toward the left, as viewed in Fig. 5, in unison therewith. Forward movement of the link 163, by means of the right-angled extension of the block 162, carries the release latch 160 (Figs. 5 and 17) counter-clockwise in unison therewith to disengage the shoulder on said lever from the ear 159 of the slide 156 to release said slide and connected parts to the action of the spring 149. The spring 149, through the levers 146 and 147, the link 151, and the arm 153, immediately shifts the slide 156 forwardly as said levers 146 and 147 move counter-clockwise. Counter-clockwise movement of the lever 146 disengages the rearward end of said lever from the stop shoulder on the clutch driven member 143 to cause said driven member to be engaged with the clutch driving member, in the usual manner. Counter-clockwise releasing movement of the lever 147 causes a stud 190 (Fig. 5) in the lower end thereof to engage a finger of a switch lever 191 to close the motor switch at the same time the clutch driven member 143 is released to cause the main operating motor to drive the machine. The switch mechanism connected to the lever 191 (Fig. 5) is not shown here, but any suitable type of switch mechanism may be used.

As the clutch driven member nears one revolution of movement counter-clockwise, the cam 144 engages a roller 187 on a downward extension of the lever 147, which, it will be remembered, is fixed to the lever 146, to rock the rearward end of said lever into the path of the shoulder on the clutch driven member 143 to terminate the movement of said driven member and to simultaneously disengage the clutch mechanism. The shape of the cam 144 is such that this clockwise restoring movement of the lever 147, through the link 151 and the arm 153, shifts the slide 156 rearwardly to move the ear 159 beyond the shoulder of the release latch 160 to permit said shoulder to drop behind said ear, and then, when the cam 144 passes out of contact with roller 186, the spring 149 returns the slide to its normal position, wherein the ear 159 engages the latch 160, to retain said slide and the levers 146 and 147 in disengaged positions, as shown here.

Once the motor switch mechanism, comprising the lever 191, is rendered operative, as explained above, it remains effective and causes the main operating motor, as well as the auxiliary motor for driving the traveling carriage mechanism, to operate continuously until a delayed-action mechanism (not shown), which is operated through a train of gearing connected to the main operating motor, shuts off or restores said switch mechanism, after said motor has run a certain interval of time without the machine's having been operated by release of the clutch mechanism, as explained above. Each time the clutch driven member 143 makes a revolution, the cam 144, in cooperation with mechanism not shown, restores the delayed-action mechanism to initial position.

Mechanism similar to that described above for the release bar 172 (Fig. 5) is provided for the release bars 170 and 171, for initiating operation of the machine.

Mechanism shown in Figs. 5, 6, and 8 is provided for locking the release bar 172 against depression unless certain conditions have been fulfilled.

This mechanism includes an arm 192 free on the left-hand stud 174, said arm being bifurcated to embrace the stud 18, which, it will be recalled, is in the stem of the release bar 172. The arm 192 has an upward extension which cooperates with a stud 193 in a locking bar 194 slidably mounted by means of three similar slots therein in cooperation with three of the studs 174, as shown here. The spring 185 (Figs. 5 and 6), which is tensioned between the arm 192 and the lever 184, urges said arm 192 counter-clockwise, causing said arm, in cooperation with the stud 186, to urge the release bar 172 upwardly to undepressed position, as shown here. A spring 195 is tensioned to urge the bar 194 forwardly to normally maintain the stud 193 in engagement with the upward extension of said arm 192.

The bar 194 (Fig. 8) carries a block 196 on its rearward end, having a stop shoulder which cooperates with three stop pawls 197, 198, and 199, pivoted on a stud 200 in the plate 168. The pawl 197 is controlled by the journal sheet feeler mechanism, and, when a journal sheet is not properly inserted around the platen roll, this pawl is brought into the path of the stop shoulder on the block 196 to obstruct rearward movement of the bar 194 to prevent clockwise movement of the arm 192, which in turn prevents depression of the release bar 172. The stop pawl 198 is controlled by the amount and item counting keys, and, when any one of these keys is partially depressed, the pawl 198 is brought into the path of the shoulder on the stop block 196 to obstruct rearward movement of the bar 194, thereby preventing depression of the release bar 172 and thus preventing operation of the machine when an amount key is in a partially depressed position. The stop pawl 199 is controlled by the traveling carriage, and, unless said carriage is in a columnar position, this pawl remains in the path of the shoulder on the block 196 to obstruct rearward releasing movement of the bar 194 to prevent operation of the machine when the traveling carriage is not properly located in a columnar position.

A full description of the operation of the stop pawls 197 and 199 will be given hereinafter in connection with the description of their respective controlling mechanisms.

When the release bar 172 (Figs. 5 and 6) is depressed, the hook-shaped upper end of the lever 184 latches over the stud 186 to retain said bar in depressed position. The restoration of the lever 184, under influence of the release link 163, as will be explained presently, moves the hook-shaped upper end of said lever out of the path of the stud 186 to permit the spring 185 to restore the motor bar 172 upwardly to undepressed position. Mechanism similar to that described above is provided for locking the release bars 170 and 171 against depression when any one of the pawls 197, 198, or 199 is effective.

Mechanism operated by the slide 156 (Figs. 5 and 17) is provided for restoring the link 163 rearwardly to normal position, to release the depressed release bar 172.

The slide 156 has therein a slot 201, through which extends a stud 202 in one arm of a bell crank 203 free on the stud 154. The bell crank 203 is bifurcated to embrace a stud 204 in a link-restoring arm 205 free on the stud 161.

Forward movement of the slide 156, as explained above, when the machine is released for operation, has no effect upon the arm 205, due to the clearance in the slot 201. However, return movement of said slide, beyond the normal position under action of cam 144, causes said slot 201, in cooperation with the stud 202, to rock the bell crank 203 counter-clockwise to in turn rock the restoring arm 205 clockwise, causing the finger-shaped upper end of said arm 205, in cooperation with the extension of the block 162, to shift the link 163 rearwardly or toward the right, as viewed in Fig. 5. Rearward restoring movement of the link 163 causes said link to rock the hook-shaped lever 184 counter-clockwise to move the upper end of said lever out of the path of the stud 186 to permit the release bar 172 to be spring-returned upwardly to undepressed position, in the manner explained earlier herein. Restoring movement of the release bar 172 (Fig. 5) and the arm 192 permits the spring 195 to restore the locking bar 194 forwardly to normal position, as shown here.

A spring 206 (Fig. 5), tensioned between the arm 205 and the latch 160, urges said parts counter-clockwise and clockwise, respectively, to normally maintain an enlarged portion of said arm 205 in contact with a stop stud 207 in the plate 168 and to cause the shoulder on the latch 160 to engage the ear 159 when the slide 156 is returned rearwardly near the end of machine operation, as explained earlier herein, to normally hold said slide in untripped position, as shown here.

Mechanism is provided for preventing repeat operations of the machine in case the starting bar 172 is inadvertently retained depressed at the end of machine operation. This mechanism is shown best in Figs. 5 and 6 and comprises a shoulder 209 on the lever 184, which shoulder cooperates with a tooth on a latch 210 free on the stud 174 and urged clockwise by a spring 211 tensioned between said latch 210 and a stud 212 in the arm 192, to normally maintain an extension of said latch in contact with said stud 212.

When the bar 194 is in its forward or normal position, as shown here. the stud 212, in cooperation with the upward extension of the latch 210, maintains the tooth of said latch out of engagement with the upper end of the lever 184. Downward movement of the stud 186 (Figs. 5 and 6), when the release bar 172 is depressed, rocks the arm 192 clockwise, as explained before, to withdraw the stud 212 from the latch 210 to free said latch for clockwise movement under influence of the spring 211. If the release bar 172 is retained depressed at the end of machine operation, return counter-clockwise movement of the lever 184 under influence of the link 163, as explained above, permits the tooth of the latch 210 to engage the shoulder 209 to secure said lever in its restored position, thereby preventing said lever from again shifting the release link 163 forwardly to initiate operation of the machine, in the manner described earlier herein. Withdrawal of the pressure from the release bar 172 permits the spring 185 to restore said bar 172 and the arm 192 upwardly to move the stud 186 into the path of the hook-shaped end of the lever 184, and to cause the stud 212 to engage the shoulder of the latch 210 to rock said latch out of engagement with the shoulder 209 on said lever 184, The release bars 170 and 171 (Fig. 5) have non-repeat mechanisms exactly like that described for the release bar 172, to prevent repeat operations when these bars are inadvertently retained in depressed position at the end of machine operation.

The gear 145 (Fig. 5), which forms a part of the clutch driven member, meshes with an idler gear 213 free on a stud 214 secured in the motor framework, said gear 213 in turn meshing with a cam shaft drive gear 215 secured on a main cam shaft 216 journaled in the main framework of the machine. As explained previously, the clutch driven member, including the gear 145, makes one counter-clockwise revolution each machine operation and, through the idler gear 213, drives the gear 215 and the main cam shaft 216 one revolution counter-clockwise, said main shaft in turn driving the main mechanisms of the machine proper to cause said mechanisms to function.

In addition to the release bars 170, 171, and 172, machine operation may be initiated by certain control keys and by means of the traveling carriage in predetermined columnar positions thereof. This automatic machine-releasing mechanism will be explained later herein in connection with the control keys and the traveling carriage mechanism.

Keyboard in general

By referring to Fig. 3, which is a diagrammatic plan view of the keyboard, it will be seen that, in the present construction, there are eleven rows of amount keys 218 and three rows of item counting keys 343, which are similar in every respect to the amount keys and, together with said amount keys, are mounted in a removable keyboard framework. To the immediate left of the item counting keys 343 is a row of correction keys 369 to 372 inclusive, used in correcting errors in certain of the totalizers and for controlling other functions of the machine. Located to the left of the correction keys is a row of control keys 374 to 380 inclusive for controlling the various functions of the totalizers, said control keys including a Release key 381 for releasing any of the keys of the main keyboard, including the amount, item counting, correction, and control keys.

Located immediately above the amount and item counting keys is a row of carriage control keys for controlling the column selecting feature of said traveling carriage and for controlling the opening and closing of the front-feed throat and the rotation of the platen roll to line-space the record material.

Located beneath the amount keyboard is an auxiliary keyboard including Month keys 383, Tens of Days keys 384, Units of Days keys 385, Year keys 386, Symbol Printing keys 390, a Black key 393 for controlling the printing of the bichrome inking ribbon, and a Release key 395 for releasing any of the keys of the auxiliary keyboard. The main and auxiliary keyboards also include various locks for controlling the depression and release of certain keys.

The machine releasing bars 170, 171, and 172, which are located on the right of the main keyboard, have associated therewith a selectively controlled mechanism for controlling certain functions of the machine and the traveling carriage, and the operation of this selectively controlled mechanism may be varied by means of a manually positionable control slide 1808, mounted on the main keyboard between the Release bar 170 and the first row of amount keys 218.

Amount keyboard

The structure and the functioning of the amount keyboard of the machine embodying the present invention are similar in every respect to the amount keyboard of the machine disclosed in the United States patent to Paul H. Williams et al., No. 2,189,851, and for that reason will be but briefly described herein.

The amount keyboard comprises a plurality of denominational rows of amount keys 218 and three rows of item keys 343 (Figs. 1 and 3), mounted in a keyboard framework comprising a top plate 188 (Figs. 10 and 11A) and a partition plate 189 for each denominational row, said partition plates being secured to said top plate. Each of the partition plates 189 has therein a slot which engages a bar 245 supported by a rod 208 secured in the main frames 131 and 130, said slots in said partition plates likewise engaging corresponding annular grooves in said rod 208. Each of the partition plates 189 has therein a notch adapted to engage a corresponding annular groove in a front rod 217 supported by the frame 130 and 131. The amount keyboard top plate 188 rests on angular surfaces formed on the main frames 130 and 131 and is secured in position by means of a locking mechanism. Release of the locking mechanism permits the amount keyboard to be removed from the machine as a unit, in case it is necessary or desirable.

Each of the partition plates 189 supports one denominational row of the amount keys 218, and, as the mechanism is substantially duplicated in each order, it is believed that a description of the mechanism associated with the denominational order shown in Figs. 10 and 11A will be sufficient.

The upper ends of the stems of the amount keys 218 for the denominational order shown in Figs. 10 and 11A are slidably supported in a slot formed by ears bent out of the upper edge of the partition plate 189, while the lower ends of the stems of said keys are slidably supported by means of square studs 219 secured in said stems and extending through corresponding slots in said partition plate 189. A bar 220, secured to the partition plate 189, extends across the lower ends of the stems of all the amount keys 218 to retain said keys against displacement upon said partion plate 189. Each of the amount keys 218 carries a stud 221, which overlies the coils of a spring 222, which extends the full length of the partition plate 189 and the opposite ends of which are anchored to studs in said plate, said spring 222 in effect being laced around said studs 221 and a plurality of studs 223 secured in said partition plate 189. The spring 222, in cooperation with the studs 221, urges the keys 218 upwardly to undepressed positions, as shown here, and immediately restores said keys to upward position when they are released after having been depressed.

The studs 221 in each one of the keys 218 extend through corresponding openings in a locking plate 224 (Fig. 11A), said openings having therein teeth which cooperate with said studs to lock the keys in undepressed position during machine operation. The studs 221 likewise extend through corresponding openings in a detent plate 225, said openings having therein teeth which cooperate with said studs to retain the keys in depressed position. The studs 221 also extend through corresponding openings in a control plate 226, said openings having angular camming surfaces which are acted upon by said studs to shift said control plate forwardly upon depression of an amount key. The plates 224, 225, and 226 are supported for horizontal shifting movement between rollers mounted on four studs 227 secured in the partition plate 189. A spring 228, tensioned between the plates 225 and 226, urges said plates forwardly and rearwardly, respectively, to maintain projecting nibs on the upper edges of said plates in contact, respectively, with a corresponding arm 229, secured in a slotted shaft 230, and a corresponding arm 231 secured in a slotted shaft 232, both of said shafts being rotatably supported in the keyboard framework.

A spring 233 (Fig. 11A) maintains an upward projection of the locking plate 224 in contact with a corresponding arm 234 secured in a slotted shaft 235 in turn journaled in the keyboard framework.

Depression of any one of the amount keys 218 (Fig. 11A) causes the stud 221 to by-pass the tooth in the corresponding opening in the detent 225, whereupon the spring 228 returns said detent forwardly to move said tooth over the stud to retain the key in depressed position against the action of the spring 222 (Fig. 10). Near the end of adding and subtracting operations, the shaft 230 is rocked counter-clockwise, causing the arm 229, in cooperation with the nib on the detent 225, to shift said detent rearwardly against the action of the spring 228 to release the depressed amount key so that it may be returned upwardly by the spring 222 to undepressed position. Near the beginning of machine operation, the shaft 235 is rocked clockwise and, by means of the spring 233, shifts the locking plate 224 rearwardly to move the teeth therein beneath the studs 221 of the undepressed amount keys 218 to lock said keys against depression during machine operation. Near the end of machine operations, the shaft 235 is returned counter-clockwise to move the locking plates 224 to ineffective positions, as shown here.

Depression of any one of the amount keys 218 causes the stud 221 therein, in cooperation with the angular camming surface in the corresponding opening in the control plate 226, to shift said plate forwardly against the action of the spring 228. Forward movement of the control plate 226 causes its forward end, in cooperation with an upward extension of a zero latch 236 free on a stud 237 in the partition plate 189, to rock said latch counter-clockwise against the action of a spring 238 tensioned between the upward extension of said latch and the control plate 226. Counter-clockwise movement of the zero latch 236 moves a tooth thereon out of engagement with a block 239 secured to an actuator 240 for this denominational row of keys, said actuator being supported for horizontal shifting movement in a corresponding slot in the rod 208, and in a corresponding slot in a rod 241 supported by the main frames 130 and 131. The bar 245, which is secured to the rod 208, overlies a horizontal surface formed by an opening in the forward end of the actuator 240 to retain said actuator in the corresponding slot in said rod 208.

As is well known, the zero latch 236 overcomes the necessity for providing a zero key and, in cooperation with the block 239, holds the actuator 240 in zero position when no amount key 218 is depressed. Obviously, depression of any of the amount keys 218 moves the zero latch 236 to ineffective position to free the actuator 240 for actuating movement back and forth, as will be explained later.

Amount actuators

The actuator 240 is connected, by a pivotal and adustable connection 242 (Figs. 11A and 11B), to a corresponding auxiliary actuator rack 243 mounted for horizontal shifting movement by means of three parallel slots therein, in cooperation with three slotted bars 244 secured in the totalizer framework 134. The rack 243 has three sets of teeth on its top edge and three sets of teeth on its bottom edge, which cooperate, respectively, with the corresponding denominational wheels of the No. 1 to No. 6 totalizers inclusive.

The actuator 240 has therein a vertical slot 247, which engages a stud 248 in a reducer arm 249 free on a shaft 250 journaled in the frames 130 and 131, and said arm 249 is connected by tapered arms to a corresponding segment 251 also free on said shaft 250. A spring 252 normally maintains a surface 253 of the arm 249 in contact with an actuator restoring bar 254 (Fig. 11A) extending between two similar arms 255 secured to the shaft 250. The spring 252 is tensioned between a bent-over ear on the arm 249 and a hook plate 256 secured to the restoring bar 254.

Counter-clockwise revolution of the main shaft 216, as explained previously, causes a pair of companion plate cams secured thereon (not shown, but fully disclosed in the co-pending application of John T. Davidson et al., Serial No. 524,846), in cooperation with a corresponding cam lever having a roller which cooperates with a cam slot in an arm secured on the shaft 250 (Fig. 11A), to rock said shaft and the restoring bar 254 first counter-clockwise and then back to normal position through an invariable extent of movement each machine operation to shift the amount actuators 240 back and forth in the usual manner for the purpose of positioning said actuators.

Depression of one of the amount keys 218 (Fig. 11A), as explained previously, shifts the control plate 226 forwardly to rock the zero latch 236 out of engagement with the block 239 to free the actuator 240 for rearward movement under influence of the restoring bar 254 and simultaneously moves the square stud 219 in said depressed key into the path of the corresponding one of a series of graduated steps 266 on the top surface of said actuator 240. Initial counter-clockwise movement of the bar 254 (Fig. 11A), by means of the spring 252, carries the arm 249, the actuator 240, and the corresponding rack 243 rearwardly in unison therewith until the step 266 contacts the stud 219 of the depressed key 218 to position said actuator, said arm 249, and said rack 243 commensurate with the value of the depressed amount key.

By observing Fig. 11A, it will be noted that there is no corresponding step on the actuator 240 for the stud 219 for the 9 key, depression of which key releases the zero latch and permits said actuator 240 to travel full distance rearwardly until a shoulder 267 engages the rod 208 to position said actuator and the rack 243 in ninth position.

The rearward end of the segment 251 (Fig. 11A) is pivotally connected by a link 276 to an arm 277, free on a shaft 278, supported in a printer framework comprising a guide plate 280 for each type carrier, and end plates 281, thus forming a framework which is rockable from normal position, as shown here (Fig. 11A), in which the type carriers do not obstruct the view of the printing line, to printing position.

The forward end of the arm 277 (Fig. 11A) carries a stud 287, which engages a notch 288 in the downward portion of a type carrier 275 for the particular denomination shown here. The type carrier 275 has two studs 289, which engage a guide slot 290 in the plate 280 to mount said type carrier for substantially vertical shifting or positioning movement under influence of the segment 251 and the actuator 240.

The sides of the upper portion of the main part of the type carrier 275 are formed over and slotted to support a plurality of type bars 291 for shiftable printing movement, said bars being held in place in said slots by a cover plate 292 (Fig. 11A), which is secured to the body portion of said type carrier 275. A spring (not shown) engages undercut portions of the type bars 291 and functions to urge and normally maintain said bars toward the left, as viewed in Fig. 11A, away from printing position. The tension of the type bar spring is comparatively weak, so that it may easily be overcome by the printing movement of the printing hammer when an impression is made.

After the rockable framework supporting the type carrier 275 has been rocked from reading position to printing position, initial rearward movement of the actuator 240, during which movement said actuator is positioned under influence of the depressed amount key 218, as explained above, through the slot 247 and the stud 248, carries the reducer arm 249 and the segment 251 in unison therewith. This, through the linkage described above, positions the type carrier 275 in agreement with the position of the actuator 240 to move the type bar 291 corresponding to the depressed amount key 218 into printing position; that is, opposite the printing line and in operating alinement with the impression hammer.

After the type carrier 275 has thus been positioned, under influence of the depressed amount key, an aliner 311 (Fig. 11A) is engaged with a corresponding tooth space 310 in an extreme downward portion of the type carrier 275 to secure said type carrier in said position during operation of the impression mechanism. After the impression has been completed, the aliner 311 is rocked out of engagement with the tooth space 310, and the rockable framework supporting said type carrier 275 is restored to normal position, as shown in Fig. 11A.

After the amount actuator 240 has been positioned under influence of the depressed amount key 218, and after the leading bar 254 has completed its initial counter-clockwise movement, an alining bar 268 (Fig. 11A) is engaged with the corresponding one of a series of alining notches 269 in the periphery of a segmental portion of the reducer arm 249 to aline said arm, the actuator 240, and the rack 243 in set position.

After the type carrier 275 (Fig. 11A) has been positioned, as explained above, and while the aliners 268 and 311 are in engagement, an impression hammer 317, for this particular denomination, functions to drive the selected type bar 291 first into contact with an inking ribbon 338 and then into contact with the record material supported by a platen roll 309 mounted in the traveling carriage 136, to record the value of the depressed amount key 218 upon said record material.

After the impression has been made, the aliners 268 and 311 (Fig. 11A) are rocked out of engagement with their respective alining notches prior to forward or clockwise return movement of the restoring bar 254, which movement restores the actuator 240, the reducing arm 249, and the type carrier 275 to normal positions, as shown here.

The printing mechanism is provided with the usual zero elimination mechanism, which prevents the zeros of the higher orders from printing and at the same time permits printing of all the zeros in the lower orders, in relation to the order in which an amount key 218 is depressed.

*Correction and control keys and auxiliary keyboard*

Directing attention to Figs. 1 and 3, located to the left of the item counting keys 343 is a row of correction keys and a row of control keys, the correction row including three Correction keys 369 for use in making corrections in the balance totalizer and in the Nos. 2, 3, and 4 totalizers, a Control key 370, which, when used in conjunction with any of the correction keys 369, causes the Nos. 1, 5, and 6 totalizers to be non-added, a No-Count key 371, which, when depressed, causes the actuators for the three rows of item counting keys 343 to be retained in zero position, and a Non-Auto key 372, which, when depressed, disables the automatic operating feature of the machine under influence of the traveling carriage in columnar positions thereof. A locking lever 373, used in conjunction with the Non-Auto key 372, locks said key in depressed position, so that said key will not be released at the end of machine operation.

The row of control keys includes a Non-Add key 374, a Sub-Total key 375, three Total keys 376 for the Nos. 2, 3, and 4 totalizers, respectively, a Subtract 1 key 377, a Sub-Balance key 378, a Balance key 379, an Add-1 List key 380, and a Release key 381. A locking lever 382 is provided for locking the Add-1 List key in depressed position, so that this key will not be automatically released at the end of machine operation.

The Correction keys exercise control over the item counting mechanism, so that, in any operation involving the keys 369 and 370, the automatic item counting mechanism is rendered inoperative. Likewise, the control keys exercise control over the automatic item counting mechanism, so that, in all operations except operations involving the use of the Subtract 1 key 377 and the Add-1 List key 380, the item counting mechanism is rendered inoperative.

In addition to the main keyboard, the present machine is provided with an auxiliary keyboard comprising twelve month keys 383 (Figs. 1 and 3), three tens of days keys 384, nine units of days keys 385, and six year keys 386, said date keys controlling the positioning of corresponding date type carriers for recording the date upon the record material. A Date Lock having a key 388 is provided for locking the date keys in depressed position, and a locking lever 389 is also provided for locking the depressed date keys against releasing, but at the same time does not lock said keys against depression.

The auxiliary keyboard also supports a plurality of List keys 390, which control the positioning of a corresponding list type carrier to effect the printing of an identifying character opposite certain items or transactions as they are listed upon the record material. A locking lever 392 is provided for locking any one of the depressed keys 390 in depressed position. The characters printed under control of the List keys 390 have one meaning when applied to debit items and another meaning when applied to credit items, and an interpretation of these characters is charted at the top of the statement sheet shown in Fig. 13.

The auxiliary keyboard likewise supports a B or black key 393 (Figs. 1 and 3), which, when depressed in subtracting operations, causes subtractive items, which are normally printed in a distinctive color, such as red, to be printed in black, this being desirable in certain cases. A locking lever 394 (Fig. 3) is provided for locking the black key 393 in depressed position.

A complete description of the black key mechanism may be had by referring to United States Patent No. 2,263,479, issued November 18, 1941, to Paul H. Williams, in which this mechanism is fully disclosed.

The auxiliary keyboard is provided with a Release key 395 for manually releasing any depressed keys of said auxiliary keyboard.

It is believed unnecessary to give a further description of the auxiliary keyboard, because the mechanism used therein is similar in every respect to the mechanism disclosed in the auxiliary keyboard shown in United States Patent No. 2,189,851, issued to Williams et al., and the United States Patent No. 2,264,582, issued December 2, 1941, to William H. Petit, to which reference may be had for a complete disclosure of this mechanism.

The keys 369 to 372 inclusive of the correction bank (Figs. 1, 3, 14, and 18) are mounted in corresponding slots in a bent-over portion of a control key plate 398, while the Control keys 374 to 381 inclusive are mounted in corresponding slots in a bent-over portion of a similar left-hand plate 399, said plates being connected together by sleeves 400, said sleeves in turn fitting over guide studs secured in the left frame 131 and being secured in place by long screws 401 (Fig. 18), which thread into said studs. The control key bank framework, comprising the plates 399 and 398, is further secured in place by means of bent-over feet on extensions of the plate 399 (Figs. 14 and 18), said feet being secured to the machine base 132. Further assisting the slots in the bent-over portions of the plates 398 and 399 in supporting the keys of the correction and control banks are bars 402 and 403 (Fig. 14) secured to their respective plates 398 and 399, said bars having corresponding slots engaged by the lower ends of the keys of their respective correction and control banks.

Machine locking mechanism

Mechanism actuated by the detents for the amount keys 218 (Figs. 3 and 11A) and the corresponding detents for the item-counting keys 343 is provided for locking the machine releasing mechanism against operation when any one of these keys is in a partially depressed position.

The rearward ends of the detents 225 for the amount and item counting banks (Figs. 8, 9, and 11A) cooperate with a rod 525 supported in the upper ends of a series of similar cranks 526 secured on a shaft 528 journaled in the partition plates 189 for the keyboard framework. A torsion spring (not shown) urges the shaft 528, the cranks 526, and the rod 525 counter-clockwise, as viewed in Fig. 11A, to normally maintain said rod 525 in yielding contact with the rearward ends of the detents 225. The right-hand end of the rod 525 (Figs. 8 and 9) engages the slotted upper end of an arm 529 free on a stud 530 secured in the right frame 130. The arm 529 carries a stud 531, which cooperates with a shoulder 532 on a crank 533 secured by a hub 534 to a short shaft 535 journaled in the right frame 130. A spring 537, tensioned between a stud 539 in the crank 533 and an arm 538 free on the hub 534, urges said parts counter-clockwise and clockwise, respectively, to cause the stud 531 to be yieldingly held between the shoulder 532 and a shoulder on the arm 538. The spring 537 likewise normally maintains an extension of the stud 539 in the crank 533 in engagement with an extension of the arm 538. Also secured on the shaft 535 is a crank 540 having a stud 541, which engages a slot in the stop pawl 198.

Partial depression of one of the amount keys 218 (Figs. 9 and 11A) causes the stud 221 therein, in cooperation with the angular nose of the corresponding tooth in the detent 225, to shift said detent rearwardly against the action of its spring 228, causing said detent to rock the rod 525, the cranks 526, and the shaft 528 clockwise, as viewed here, against the action of the spring 536. The rod 525 likewise rocks the arm 529 clockwise in unison therewith, causing the stud 531, in cooperation with the shoulder on the arm 538, to rock said arm counter-clockwise. Counter-clockwise movement of the arm 538, through the spring 537, carries the crank 533, the shaft 535, and the crank 540 counter-clockwise in unison therewith. Counter-clockwise movement of the crank 540, through the stud 541, rocks the pawl 198 clockwise into the path of the stop block 196 (Figs. 8, 9, and 11A) to obstruct rearward releasing movement of the bar 194 to prevent operation of the machine releasing mechanism while an amount key 218 is partially depressed. Full depression of an amount key 218 permits the spring 228 to return the detent 225 forwardly, whereupon the spring 536 moves the rod 525 forwardly or counter-clockwise in unison therewith to move the pawl 198 to ineffective position, so that the machine may be released for operation in the usual manner.

The item counting keys 343 (Fig. 3) function exactly like the amount keys 218 to control the releasing movement of the bar 194.

Totalizers

By referring to Figs. 11A and 11B, it will be recalled that the actuator 240 has connected thereto a rack 243, which is slidably supported in the totalizer framework on the three rods 244. The rack 243 has six sets of teeth, which cooperate, respectively, with the corresponding wheels of the No. 1 to No. 6 totalizers inclusive. The six totalizers are similar in every respect, all of them being of the add-subtract type, and, as this particular type of totalizer has been fully disclosed in the patents referred to hereinbefore, it is believed that a somewhat general description of the No. 1 or balance totalizer will be sufficient.

In the present arrangement, the No. 1 totalizer is used as a balance totalizer or crossfooter, the No. 2 totalizer is used for storing new balances, the No. 3 totalizer is used for storing a total of the deposits, the No. 4 totalizer is used for storing a total of checks, and the No. 5 totalizer is used as an overdraft totalizer. The overdraft totalizer is always complementary to the No. 1 or balance totalizer, and therefore, when the balance totalizer is in an overdrawn condition, mechanism, which functions automatically, causes the overdraft totalizer to be read or reset in balance or sub-balance operations in order to obtain a positive recording of the amount of the overdraft. The No. 1 to No. 5 totalizers inclusive have thereon eleven totalizer wheels corresponding to the eleven rows of amount keys 218 (Fig. 3). The No. 6 totalizer is an item counting totalizer, used for counting certain predetermined items, and has thereon three wheels corresponding to the three rows of item counting keys 343.

The No. 1 or balance totalizer, which will be used as representative of all the totalizers, has a wheel 559 (Fig. 11B) for each denominational order, each of said wheels having twenty teeth and also having on one face thereof a tripping cam 550 having diametrically opposed tripping and/or stop teeth which cooperate with the teeth on corresponding add-tripping pawls 560 and corresponding subtract tripping pawls 561. The wheels 559 are rotatably mounted on a No. 1 totalizer shaft, which extends between the side arms of a rockable framework 562, pivoted at 563 to the totalizer framework 134.

In adding operations, after the actuator 240 and the rack 243 (Figs. 11A and 11B) have completed their initial rearward movements and have been positioned by the depressed amount key 218 in the manner explained above, the wheel of the No. 1 or balance totalizer, corresponding to the denomination shown here, is engaged with the corresponding teeth on the upper edge of said rack 243, and simultaneously therewith a transfer actuating bar 566 is restored to untripped position, as shown here in full lines.

Return forward movement of the actuator 240 and the rack 243 rotates the wheel 559 in an additive or clockwise direction to enter in said wheel an amount equal to the value of the depressed amount key 218. If the wheel 559 passes through zero while traveling in an additive direction, one of the diametrically opposed teeth of the tripping cam 550 engages the tooth of the add tripping pawl 560 to rock said pawl clockwise to release a tripping lever 564, free on a stationary stud 565 in the framework 134, to the action of a spring 567, which immediately rocks said lever a slight distance counter-clockwise until an upward extension thereof contacts the bar 566. After the actuator 240 and the rack 243 have completed their return forward movements, the teeth of the wheel 559 are disengaged from said rack, and said teeth are simultaneously engaged with the corresponding transfer segment, not shown but similar to a segment 568, Fig. 11B, with which the teeth of the next higher order wheel 559 are simultaneously engaged. The transfer segment 568 is pivotally mounted on a stud in a plate supported by the framework 134. The segment 568 carries a stud 569, which engages a Y-shaped slot 570 in the transfer lever 564.

After the lower order totalizer wheel 559 has been disengaged from the rack 243, the transfer restoring bar 566 is released, in the well-known manner, and moves under spring action to the position shown in dot-and-dash lines (Fig. 11B), permitting the transfer lever 564 to move counter-clockwise in unison therewith. During counter-clockwise movement of the lever 564, a spring 571, tensioned between the stud 569 and the bail of a rockable yoke 572, guides said stud into the right-hand or rearward branch of the Y-shaped slot 570. This rocks the segment 568 counter-clockwise to advance the next higher order wheel 559 one tooth space in an additive direction to effect the transfer of a tens digit from the denomination shown here to the next higher denomination.

In the very beginning of subtract operations, a transfer pawl shifting bar 573 (Fig. 11B) is rocked counter-clockwise, as viewed here, to move the add-transfer pawl 560 out of cooperative relationship with the teeth of the tripping cam 550 and to simultaneously move the subtract transfer pawl 561 into cooperative relationship with the tripping teeth of said cam. Simultaneously with the rocking of the bar 573, the yoke 572 is rocked counter-clockwise to shift the position of the upper end of the spring 571, so that said spring will lead the stud 569 into the left-hand or forward branch of the Y-shaped slot 570 when the transfer lever 564 functions in subtract operations, as will be explained presently.

In subtract operations, prior to initial rearward movement of the actuator 240 and the rack 243 (Figs. 11A and 11B), the wheel 559 of the balance totalizer is engaged with the corresponding teeth on the upper edge of said rack, whereupon initial movement of said rack rotates said wheel in a subtractive or counter-clockwise direction to enter therein an amount equal to the value of the depressed amount key 218. If the wheel 559 passes through zero while being rotated in a subtractive direction, one of the diametrically opposed teeth on the tripping cam 550 engages the pawl 561 and rocks said pawl counter-clockwise to release the transfer lever 564, which has previously been restored to untripped position in the beginning of the subtract operation immediately after the wheel 559 has been disengaged from its corresponding transfer segment and engaged with the rack 243.

After the actuator 240 and the corresponding rack 243 (Fig. 11B) have completed their initial rearward movement, the wheel 559 is rocked out of engagement with said rack and into engagement with the corresponding transfer segment 568, after which the transfer restoring bar 566 is released to spring action, which immediately moves said bar to the position shown in dot-and-dash lines, to permit the transfer lever 564 to move counter-clockwise in unison therewith. During counter-clockwise movement of the transfer lever 564, the spring 571, which is now in its left-hand position, guides the stud 569 into the left-hand branch of the Y-shaped slot 570 to cause said slot to rock the segment 568, for the next higher order wheel 559, clockwise to move said next higher order wheel one step in a subtractive direction to effect a tens transfer.

If the succeeding operation is other than a subtract operation, the bar 573 (Fig. 11B) and the yoke 572 are returned clockwise to the positions shown here to move the subtract pawl 561 to ineffective position and to simultaneously move the adding pawl 560 to effective position, and to position the spring 571 so that it will guide the stud 569 into the right-hand branch of the slot 570.

In sub-total and total recording operations, the wheel 559 of the No. 1 or balance totalizer is engaged with the rack 243 prior to initial rearward movement of said rack, which movement rotates said wheel in a reverse or counter-clockwise direction until one of the diametrically opposed teeth on the tripping cam 550 engages the inside surface of the tooth of the add-tripping pawl 560. This positions the wheel 559 at zero, and said wheel in turn positions the rack 243, the actuator 240, and the type carrier 275 in accordance with the amount standing upon said wheel, so that said amount will be recorded upon the record material upon the operation of the impression mechanism immediately thereafter.

In total recording operations, the wheel 559 is disengaged from the rack 243 prior to return forward movement thereof, and consequently said wheel remains in a zeroized condition. In sub-total recording operations, the wheel 559 remains in engagement with the rack 243 during its return forward movement and is consequently restored to its original position.

The foregoing brief explanation of the transfer mechanism for the No. 1 or balance totalizer applies equally as well to all the other totalizers, as they are similar in construction and function in exactly the same manner as the balance totalizer.

Each of the six totalizers, including the balance totalizer, is provided with an engaging mechanism comprising engaging and disengaging cams for rocking the wheels of said totalizers into and out of engagement with the teeth of the racks 243 (Fig. 11B). The set of engaging and disengaging cams for each of the totalizers is provided with corresponding shiftable links and latch mechanism for connecting said cams to a common operating mechanism, comprising a reciprocating bar having an invariable movement, which bar is engageable by the latch mechanism.

The controlling of the engagement and disengagement of the latch mechanism with and from the reciprocating bar causes the selected totalizer to be connected with and operated by said bar in the proper timing to effect the type of operation desired, including adding, subtracting, sub-total taking, and total taking operations. The controlling of the engagement and disengagement of the latch mechanism for each of the totalizers with and from the reciprocating bar may be effected either by the row of control keys 374 to 380 inclusive (Fig. 3) or by the traveling carriage 136 (Figs. 1 and 11A) in predetermined columnar positions thereof.

Inasmuch as the totalizer engaging mechanism which is fully shown and described in application Serial No. 524,846, hereinbefore referred to, is not pertinent to the present divisional application, it is believed that the above general description thereof will be sufficient.

Overdraft mechanism

When the No. 1 or balance totalizer is in a positive condition, it is always selected for recording purposes in sub-balance and balance operations, which operations are also referred to as sub-total and total recording operations when reference is made to other than the No. 1 or balance totalizer. When said balance totalizer changes from a positive condition to a negative condition, mechanism is automatically rendered effective for causing the No. 5 or overdraft totalizer to be selected for recording purposes in sub-balance and balance operations, and this procedure is the same irrespective of whether the operations are initiated through the traveling carriage in columnar positions thereof, or through the control keys. When the balance totalizer changes from a negative condition to a positive condition, the automatic controlling mechanism is rendered ineffective, and, as before, the No. 1 or balance totalizer is selected for recording purposes in sub-balance and balance operations.

Normal sub-total and total recording operations, in which the No. 1 or balance totalizer is in a positive condition, will be known herein as "sub-balance" and "balance" operations. Overdraft operations, in which the No. 1 totalizer is overdrawn and the No. 5 totalizer is selected for recording purposes, will be known herein, respectively, as "sub-balance of the overdraft" and "balance of the overdraft" operations.

It is to be understood that in balance operations, in which the No. 1 or balance totalizer is cleared, the amount cleared therefrom is simultaneously added into the No. 5 or overdraft totalizer in order to simultaneously zeroize said totalizer. Likewise, in balance of the overdraft operations, in which the No. 5 totalizer is cleared, the amount cleared therefrom is simultaneously added into the No. 1 totalizer in order to zeroize said totalizer. In sub-balance operations, the No. 5 totalizer remains inactive, or non-added, and in sub-balance of the overdraft operations the No. 1 totalizer remains inactive, or non-added.

Figure 2:
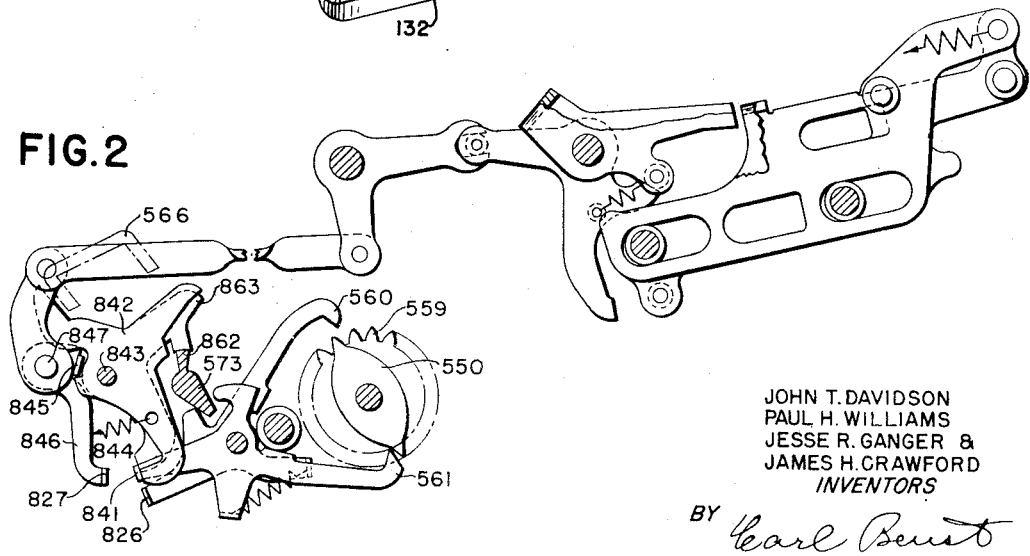
Fig. 2 is a left side elevation of the mechanism for unlocking the automatic overdraft control mechanism when the balance totalizer is overdrawn.

By referring to Figs. 2 and 11B, it will be recalled that, in the beginning of subtract operations in the No. 1 or balance totalizer, the transfer pawl control bar 573 is rocked counter-clockwise as viewed in Fig. 11B and clockwise as viewed in Fig. 2 to move the add transfer pawls 560 out of the path of the tripping teeth on the tripping cams 550 and to simultaneously move the subtract transfer pawls 561 into the path of said teeth. When the highest order wheel 559 (Fig. 2) of the No. 1 or balance totalizer passes through zero while being rotated in a subtractive direction—i. e., said totalizer becomes overdrawn—one of the diametrically opposed tripping teeth on the tripping cam 551 rocks the highest order subtract transfer pawl 561 clockwise to disengage an ear 841 on a rearward extension thereof from a projection on an overdraft shaft actuator 842 free on a rod 843 supported by the totalizer framework. This releases the overdraft actuator 842 to the action of a spring 844, which immediately moves said actuator a slight distance until an upward extension thereof contacts the rearward edge of the transfer restoring bar 566, which bar at this time has received restoring movement and is being retained in normal position by the hooks, in the well-known manner, as shown in dot-and-dash lines in Fig. 2.

After the racks 243 have completed their initial rearward movement and the wheels of the balance totalizer have been disengaged therefrom, the transfer restoring bar 566 is released to the action of its spring, which immediately urges it clockwise (Fig. 2) to effect the transfer movement of all tripped transfer pawls and to simultaneously effect clockwise movement of the overdraft actuator 842, under influence of its spring 844. Clockwise movement of the actuator 842 causes a projecting shoulder thereon, in cooperation with a bent-over ear 845 on an arm 846 secured on an overdraft shaft 847 journaled in the totalizer framework, to rock said arm 846 and said shaft 847 counter-clockwise.

Should the No. 1 or balance totalizer be changed from a negative condition to a positive condition by the entering therein of an amount large enough to overbalance the amount of the overdraft, the overdraft shaft 847 and connected parts are restored clockwise to normal position.

In adding operations, the transfer control bar 573 is restored counter-clockwise from the position shown in Fig. 2 to normal or adding position and, being thus restored, rocks the subtract pawls 561 out of the path of the tripping teeth on the cams 550 and simultaneously rocks the adding pawls 560 into the path of said teeth. Simultaneously, with the restoring of the bar 573, the transfer restoring bar 566 rocks the overdraft actuator 842 counter-clockwise against the action of the spring 844 to ineffective or normal position, whereupon an upwardly extending ridge 862 on said bar 573 moves beneath an extending shoulder on said actuator 842, to retain said actuator in untripped position, as shown here. Simultaneously the ridge 862 moves from beneath a downward projection on an overdraft shaft restoring arm 863 free on the rod 843, to permit a downward extension thereof to come to rest on a bent-over ear 826 on the highest order add-transfer pawl 530.

When the balance totalizer changes from an overdrawn condition to a positive condition—that is, when the highest order wheel 559 passes through zero while moving in an additive direction—one of the diametrically opposed teeth on the tripping cam 550 engages the highest order add-transfer pawl 560 and rocks said pawl counter-clockwise (Fig. 2) to disengage the ear 826 from the downward extension of the restoring arm 863 to release said arm to the action of its spring (not shown, but similar to the spring 844), which immediately urges said arm clockwise until an upper extension thereof contacts the transfer restoring bar 566, which is in the position shown here in dot-and-dash lines.

In adding operations, after the racks 243 (Fig. 11B) have completed their return movement forwardly and after the No. 1 or balance totalizer has been disengaged therefrom, the transfer restoring bar 566 is released to spring action, which immediately moves said bar clockwise (Fig. 2) to effect the transfer of tens digits from lower to higher denominations in the usual manner. Clockwise movement of the bar 566 permits the restoring arm 863 to move in unison therewith, whereupon the downward extension of said arm engages a bent-over ear 827 on the lower end of the arm 846 to rock said arm and the overdraft shaft 847 clockwise (Fig. 2) to normal position.

*Traveling carriage*

By referring to Figs. 1, 11A, and 11B, it will be recalled that the present machine is provided with a traveling carriage 136, which rotatably supports the platen roll 309, said platen roll in turn presenting the record material wound therearound, such as a statement slip 1550, a fragment of which is shown in Fig. 13, to the recording or printing mechanism. The platen roll 309 is movable from printing position to a more accessible position, often referred to as open throat or front feed position, for the ready removal and insertion of record material at the front of said platen roll instead of the conventional method of inserting record material at the back of said platen roll and winding it therearound.

This type of traveling carriage is often referred to as the front feed type, and, when the platen roll 309 is moved from printing position to front feed position, the pressure rollers used to maintain the record material in feeding contact with the surface of said platen roll are released, and the front feed throat for guiding the record material around said platen roll is opened, so that the statement sheet, which is in printing position, and which has been audited, may be readily removed from the machine and a new sheet inserted into the open throat and pushed directly into printing position by the aid of a line-finding device, which forms a part of the front-feed throat.

The traveling carriage 136 (Figs. 1, 11A, and 11B) is movable in a tabulating direction and in a return direction, and the mechanism for moving said carriage in either direction is connected by a hydraulic clutch device to a semi-continuously running electric motor, which operates in unison with but independently of the main operating motor and is for the primary purpose of operating the traveling carriage mechanism.

The different functions of the traveling carriage 136 may be controlled by the row of carriage control keys located just above the amount keyboard (Figs. 1 and 3), said row of keys including a Left Margin key 1066, ten Column Selecting keys 1070, a Tabulating key 1071 for tabulating said carriage from column to column, a Carriage key 1072 for opening and closing the front feed throat, and a Paper Feed key 1073 for causing the platen roll 309 to be rotated to line-space the record material supported thereby.

The column selecting keys 1070 operate through an indexing device, which is operatively connected to the traveling carriage and is indexed one step each time the traveling carriage moves from one columnar position to the next. In this manner, the indexing device senses the position of the traveling carriage and determines whether said carriage shall be moved in a return direction or in a tabulating direction, depending upon the location of the selected columnar position with respect to the printing mechanism. This in effect causes the ten column selecting keys 1070 to function either as tabulating keys or as carriage return keys to cause the traveling carriage to be moved either in a tabulating direction or in a return direction from any preselected columnar position directly to the columnar position corresponding to the depressed column selecting key 1070.

The semi-continuously running motor for the traveling carriage, in addition to driving said carriage in return and tabulating directions, is directly connected to and operates a cam shaft for driving a plurality of cams which are in turn connectable to said shaft by their respective clutch devices, said clutch devices in turn being controlled by the carriage control keys 1070, 1071, 1072, and 1073 for operating the different mechanisms associated with said traveling carriage. The cams referred to above operate, respectively, the mechanism for releasing the traveling carriage for either tabulating or return movement, the mechanism for reversing movement of the traveling carriage, the throat-opening mechanism, the mechanism for rotating the platen roll 309 to cause the record material to be line-spaced, and the mechanism for operating the automatic machine-releasing mechanism.

The automatic machine-releasing mechanism is not under control of the carriage control keys 1066 to 1073 inclusive, but is controlled by the correction keys 369 (Fig. 3) and the control keys 376 to 388 inclusive, and, in addition, this mechanism may be controlled by the traveling carriage in predetermined columnar positions thereof.

*Automatic machine-releasing mechanism*

Mechanism controlled by certain of the control keys and certain of the correction keys, and by the traveling carriage in tabulated positions thereof, is provided for causing the machine to be automatically released for operation, thereby simplifying operation of the machine by eliminating depression of any of the starting bars in certain types of operations. The automatic machine-releasing mechanism will now be described.

Referring now to Figs. 3, 14, and 18, the studs 413 in the control keys 376, 377, 378, and 379 cooperate with angular camming surfaces formed in apertures in a control plate 1756 supported for horizontal sliding movement by the studs 416. The control plate 1756 has, in its upper edge, teeth which mesh with teeth in a segmental pinion 1757 secured on the left-hand end of a shaft 1758 journaled in the plates 398 and 399 (Fig. 14). The shaft 1758 has secured on its right-hand end a similar segmental pinion 1759, which engages teeth in the upper edge of a control plate 1760 (Fig. 12) supported for horizontal shifting movement on the plate 398. The control plate 1760 has angular camming surfaces 1755 (Fig. 12) formed in openings thereof, which cooperate with the studs 410 carried by the Correction keys 369.

The control plate 1760 (Fig. 12) carries a stud 1761, which cooperates with an upward extension 1762 of a pitman 1763 slidably mounted by means of horizontal slots therein, in cooperation with studs in the left frame 131. The pitman 1763 has, in its rearward end, a slot 1764, engaged by a hook formed on the forward end of a rod 1765, the rearward end of which rod has an eye which engages a stud 1766 in the lower end of a crank 1767 secured near the left-hand end of a machine release shaft 1768 journaled in rearward extensions of the frame 1087 (Figs. 4B, 15A, and 15B). Secured on the right-hand end of the shaft 1768 (Figs. 4B, 15A, and 15B) is an upwardly extending arm 1769 pivotally connected by a link 1770 to an arm 1771 secured on a shaft 1772, opposite ends of which are journaled in the frame 1087 and the right-hand cover plate 1136. A spring 1773 (Fig. 15B) urges the arm 1771 and the shaft 1772 clockwise to normally maintain a latch 3209 (Fig. 19) carried by said shaft in engagement with an extension of a clutch operating yoke 1774, which controls the engaging and disengaging of a clutch driving member 1775 mounted to rotate in unison with a continuously operating power shaft 1153 journalled in the frame 1087 and to shift axially in relation thereto through the medium of splines and clutch cuts. The yoke 1774 is rotatably journalled on a vertical stud 3200 which is in turn supported by the frame 1087 and the top plate 1136. One arm of the yoke 1774 has a forward projection 3208 which is engaged by the tooth of a latch 3209, free on a shaft 1772 which is journalled in the frame 1087 and the top plate 1136. A spring 3211 tensioned between one arm of the yoke 1774 and the latch 3209 urges said parts clockwise to normally maintain the latch in engagement with the projection 3208. The latch 3209 has formed therein an L-shaped slot 3212 through which extends an upturned projection 3213 on a latch disengaging arm 3214 pivotally and shiftably mounted on one arm of the yoke 1774 by means of a stud 3220 which engages a slot in the arm of said yoke. A spring 3215 is tensioned between the arm 3214 and one arm of the yoke 1774 so as to urge said arm 3214 counter-clockwise and at the same time to urge said arm rearwardly to normally maintain the stud 3220 in the rear end of the slot as shown in Fig. 19. The upturned projection 3213 on the arm 3214 cooperates with a latch disengaging pawl 3216 secured to the shaft 1772.

When the shaft 1768 (Fig. 15B) is operated in a manner presently to be described, the shaft 1772 and the pawl 3216 are rocked counter-clockwise against the tension of the spring 1773 thereby causing said pawl in cooperation with the upturned projection 3213 to shift the arm 3214 forwardly against the action of spring 3215 and, since the upturned projection 3213 is in the narrow portion of the L-shaped slot 3212, the latch 3209 will be rocked counter-clockwise in unison therewith to disengage the tooth of said latch from the projection 3208 on the yoke 1774. This releases the yoke to the action of the spring 3211 which immediately shifts said yoke clockwise and causes the teeth of the clutch member 1775 to engage with corresponding teeth in a clutch driven member 1776 so as to cause the latter member to be driven through one revolution in a clockwise direction as viewed from the left hand side of the machine. The clutch driven member 1776 is integral with a sleeve 1777 free on the shaft 1153, said sleeve also having integral therewith companion plate cams 1778 and 1779 (Fig. 17). The peripheries of the plate cams 1778 and 1779 are engaged, respectively, by rollers 1780 and 1781 secured in a V-shaped lever 1782 in turn secured on a shaft 1783 journaled in the frame 1087. Also secured on the shaft 1783 (Figs. 4B and 17) is a crank 1784 pivotally connected by a link 1785 to the upper end of a lever 1786 free on a stud 1787 in the plate 1191. The lower end of the lever 1786 is slotted to receive a stud 1788 in the upper end of a crank 1789 secured by a hub 1790 to a companion arm 1791, said hub being free on a shaft 1792 journaled in the plates 1191 and 1388 (Figs. 4A, 4B and 16). The rearward end of a link 1793 is pivotally connected to the arm 1791, while the forward end of said link is slotted to receive a stud 1794 in the lower end of an arm 1795 connected by a hub 1796 to a crank 1797, said hub being free on a shaft 1798 journaled in the main frames 130 and 131. The crank 1797 is connected by a link 1799 to a lever 1800 free on the stud 161 and having an extension 1801, which is arranged to engage a stud 1802 in the lever 160.

Depression of any one of the control keys 376, 377, 378, or 379 (Fig. 18) or any one of the Correction keys 369 (Fig. 12) shifts the control plate 1760 forwardly, which, through the pitman 1763 and the rod 1765, rocks the crank 1767 and the shaft 1768 counter-clockwise. Counter-clockwise movement of the shaft 1768 as viewed in Fig. 12, and clockwise movement of said shaft as viewed in Figs. 4A and 4B, through the arm 1769 and the link 1770, actuates the clutch mechanism for the cams 1778 and 1779 to cause said cams to make one clockwise revolution, as viewed in Fig. 17. Revolution of the cams 1778 and 1779 rocks the lever 1782, the shaft 1783, and the crank 1784 first counter-clockwise and back to normal position. Counter-clockwise movement of the crank 1784, through the link 1785 and the lever 1786, rocks the cranks 1789 and 1791 first counter-clockwise to shift the link 1793 rearwardly. Rearward movement of the link 1793, through a spring 1803 connecting said link to the arm 1795, rocks said arm and its companion crank 1797 counter-clockwise, which movement, through the link 1799, also rocks the lever 1800 counter-clockwise. Counter-clockwise movement of the lever 1800 causes the extension 1801 thereof to engage the stud 1802 in the release lever 160 to rock said lever also counter-clockwise to disengage the shoulder on its extension from the bent-over ear 159 to release the slide 156 (Figs. 5 and 17), which in turn releases the machine for operation in the manner explained earlier herein. After the cams 1778 and 1779 (Fig. 17) have completed one revolution of movement, a homing mechanism assists in disengaging the clutch mechanism for said cams and locates said cams in normal positions, as shown here. As shown in Fig. 20, this mechanism consists of a notched disc 3161 secured to the sleeve 1777 and a roller 3163 mounted on an arm 3164 which is pivoted on a rod 3165 supported by the frame 1087. The arm 3164 is urged counter-clockwise by a spring 3166 so as to normally maintain a foot formed on the lower end thereof in contact with a finished surface on the frame 1087. When the clutch driving member 1775 is engaged with the teeth of the clutch driven member 1776 as explained above, clockwise rotation of the member 1776 and the parts connected thereto causes the angular notch in the periphery of the disc 3161 to move away from the roller 3163 so as to rock the arm 3164 clockwise and tension the spring 3166. After the parts have neared the completion of one revolution of movement, the angular notch in the disc 3161, in cooperation with the roller 3163 and under the influence of the spring-tensioned arm 3164, accelerates the final movement of the parts into home position to cause them to revolve faster than the shaft 1153 whereupon the angular surfaces on the clutch teeth in the driven member 1776 in cooperation with the similar surfaces on the clutch teeth of the driving member 1775, shift the latter member toward the right as viewed in Fig. 19.

Clockwise movement of the yoke 1774 when the latch 3209 is disengaged from the projection 3208 thereof as explained earlier herein, causes a downwardly extending ear 3167 on said yoke to engage the arm 3214 and carry the arm clockwise in unison therewith so as to move the upturned projection 3213 thereon out of the narrow branch of the L-shaped slot 3212 and into the wide portion of said slot. This will permit the spring 3215 to return the tooth of the latch 3209 into the path of the projection 3208 and permit the outward step on the pawl 3216 to engage with the upturned projection 3213 and thereby retain the arm 3214 in its clockwise position. As the clutch member 1775 is shifted toward the right by the accelerated movement of the driven member 1776 under the influence of the arm 3164 and the spring 3166 (Fig. 20), said clutch member 1775 will carry the yoke 1774 counter-clockwise in unison therewith to cause the projection 3208 to by-pass the tooth of the latch 3209 whereupon said latch will engage over said projection and thereby retain said yoke and the clutch member 1775 in disengaged position as shown in Fig. 19. The roller 3163 will seat in the notch in the disc 3161 and retain the driven member 1776 and the cams 1778 and 1779 in their home positions.

The lever 1800 (Fig. 17) carries a stud 1804, which cooperates with a downward extension of a lever 1805 free on the stud 177. The lever 1805 has an upward extension, which cooperates with the block 196 on the locking bar 194, and, when any one of the pawls 197, 198, or 199, shown in Fig. 8, obstructs rearward movement of the bar 194, the lever 1805 likewise obstructs counter-clockwise releasing movement of said lever 1800, to prevent automatic initiation of operation of the machine.

*Traveling carriage control of machine functions*

A sensing mechanism, cooperating with tappets mounted in control blocks (Figs. 7 and 11B), controls various functions of the machine, including automatic release of the machine for operation, automatic return of the traveling carriage to the Pick-Up column, a lock for controlling movement of the platen roll 309 to and from printing position, control of the line-spacing movement of the platen roll 309, a lock to prevent operation of the machine unless the traveling carriage is located in one of its columnar positions, and various other controls not pertinent to the present invention.

The traveling carriage 136 is provided with a plurality of control blocks 722 (Figs. 7, 8, and 11B), one for each columnar position of said carriage, said blocks being slotted to slidingly engage the protruding edges of a control block bar 729 having similar bent-over upward extensions which fit in corresponding parallel grooves in a bottom plate 730 of the carriage 136. A pinch-operated clamp 731, mounted in each of the blocks 722, engages tooth spaces in the forward edge of the bar 729 to adjustably secure said blocks 722 in proper locations on said bar 729. The bar 729 extends the full length of the carriage 136, and any number of the control blocks 722 (not exceeding ten) necessary to obtain the desired control may be located thereon in positions corresponding to the various columnar divisions of the record material being used in connection with the particular system.

Each of the control blocks 722 (Figs. 7, 8, and 11B) has a stop projection 733, which cooperates with tabulating stop plungers in the usual manner, to locate the carriage 136 in its various columnar positions.

Referring to Figs. 7, 11B, 15A, and 15B, each of the control blocks 722 may, if desired, carry a series of control tappets 1914 to 1921 inclusive, which cooperate with their respective sensing levers 1922 to 1929 inclusive, said control tappets being secured in the control blocks 722 by screws 683. The sensing levers 1922 to 1929 inclusive are rotatably mounted on a stud 1930 (Fig. 8) in the frame 133, and all of said sensing levers with the exception of the sensing levers 1922 and 1927 have upwardly extending sensing projections, adapted to sense the corresponding control tappets.

Each of the sensing levers 1922 to 1929 inclusive (Figs. 4B and 15B) has a downwardly extending guide tip 1958, which cooperates with a corresponding slot 1959 in a plate 1960 secured between the plate 1176 and the frame 133 to maintain the right-hand ends of said levers in properly spaced lateral relationship with each other.

*Carriage control of automatic machine release*

The sensing lever 1922 (Figs. 7 and 16) has, mounted on its left end, a flexible sensing finger 1932, which is retained in an upright position by a tension spring (Fig. 15B), said finger being rigid when engaged by the tappet 1914 when the traveling carriage is moving in a tabulating direction or from right to left as viewed from the front of the machine, so as to depress the sensing lever 1922, and said finger being flexible when engaged by the tappet 1914 when the traveling carriage is moving in a return direction, so as to by-pass said tappet without imparting movement to the sensing lever 1922.

When the traveling carriage 136 (Figs. 7, 11A, 11B, and 16), while traveling in a tabulating direction, moves into a columnar position having one of the tappets 1914 assembled in the control block 722 therefor, said tappet, in cooperation with the finger 1932, depresses the left-hand end of the lever 1922 thereby causing a projection on the right-hand end of said lever, in cooperation with a slot 1913 in a link 1933, the rearward end of which is pivotally connected to a crank 1935 secured on the overdraft shaft 847, to rock said link 1933 clockwise or upwardly. Upward movement of the link 1933 (Fig. 16) causes a stud 1936 carried thereby, in cooperation with the hook-shaped upper end of an arm 1937 free on a stud 1938 in a lever 1939, to rock said lever counter-clockwise on its pivot stud 1940, which is secured in the right frame 130. Counter-clockwise movement of the lever 1939, through a link 1941, the forward end of which is pivotally connected to said lever and the rearward end of which is slotted to receive a stud 1942 in the lower end of an arm 1943 secured on the machine release shaft 1768, rocks said arm 1943 and said shaft 1768 clockwise (Figs. 4B and 15B). Clockwise movement of the shaft 1768 renders the clutch mechanism for the automatic machine releasing mechanism effective to cause the cams 1778 and 1779 (Fig. 17) to make one clockwise revolution to release the machine for operation in exactly the same manner as explained in connection with the motorized control and correction keys.

When the machine is automatically released for operation by means of the traveling carriage in tabulated columnar positions thereof, as described above, clockwise movement of the arm 1943 (Figs. 15B and 16) causes a bent-over extension 1954 thereof, in cooperation with an upward extension 1955 of the arm 1543, to rock said arm, the shaft 1541, and the finger 1540 clockwise to disengage said finger from the shoulder 1539 on the lever 1534, to cause the platen roll 309 to be returned from open throat position to printing position in the well-known manner.

*Disabling of automatic machine release*

In overdraft operations, it is desirable to disable the automatic machine-releasing mechanism, and this has been effected in the following manner.

Referring to Figs. 2 and 16, it will be recalled that, when the No. 1 or balance totalizer becomes overdrawn, the overdraft shaft 847 is rocked counter-clockwise, as viewed in Fig. 2, and clockwise, as viewed in Fig. 16. Clockwise movement of the shaft 847 (Fig. 16) and the crank 1935 shifts the link 1933 rearwardly to move the stud 1936 out of engagement with the hook-shaped upper end of the arm 1937, so that upward movement of said link will have no effect upon the lever 1939 and connected mechanism, thereby disabling the automatic operation of the machine by means of the traveling carriage.

The link 1933 is retained against lateral displacement by means of a bent-over portion 1934 of the lever 1939, which, in cooperation with the left-hand face of said lever 1939, shiftably supports the forward end of said link 1933. As soon as the balance totalizer becomes positive, the overdraft shaft 847 is returned counter-clockwise (Fig. 16) to its original position to move the stud 1936 beneath the hook-shaped upper end of the arm 1937.

Depression of the Non-Auto key 372 (Figs. 1, 3, and 16) disconnects the hook-shaped upper end of the arm 1937 from the stud 1936 to disable the operation of the automatic machine-releasing mechanism by the traveling carriage in tabulated columnar positions thereof.

Depression of the Non-Auto key 372 causes a right-hand extension of the stud 410, carried thereby, in cooperation with a forward extension of a lever 1956 free on a stud 1944 in the left frame 131, to rock said lever counter-clockwise. A downward extension of the lever 1956 has therein a slot which engages a stud 1945 in the upper end of a crank 1946 secured on the left-hand end of the shaft 1798, which, it will be recalled, is journaled in the main frames 130 and 131. Secured on the right-hand end of the shaft 1798 is a crank 1947 pivotally connected by a link 1948 to a crank 1949 secured on a short shaft 1950 journaled between the plate 1191 (Figs. 4A and 4B) and the plate 1388.

Upon depression of the Non-Auto key 372, counter-clockwise movement of the lever 1956, through the linkage described above, rocks the shafts 1798 and 1950 clockwise, which movement, by means of a crank 1951 secured on said shaft 1950 and a link 1952 connecting said crank to the arm 1937, rocks said arm counter-clockwise against the action of a spring 1953 to disengage the hook-shaped upper end of said arm from the stud 1936 to render the automatic releasing means inoperative.

*Carriage control of machine locking mechanism*

In addition to the lever 1922, explained above, there is another push-down type of lever 1927 having an upturned finger 1961 (Figs. 7, 8, and 15B), which extends above the projections 1931 for the levers 1923 to 1926 inclusive, and levers 1928 and 1929, which, as explained previously, are the sensing type of levers and are moved upwardly to sense their corresponding tappets at the beginning of machine operation.

When the traveling carriage 136 moves into any one of its columnar positions, the tappet 1919 in the control block 722 for the particular columnar position engages the finger 1961 of the lever 1927 and rocks said lever counter-clockwise as viewed from the front of the machine against the action of a tension spring (not shown) connected thereto. Counter-clockwise movement of the lever 1927 causes a rounded portion 1962 on its right-hand end, in cooperation with a slot in one arm of a bell crank 1963 free on a stud 1964 extending between the frame 130 and the plate 1191 (Fig. 15B), to rock said bell crank 1963 counter-clockwise, as viewed in Fig. 8. A downwardly-extending arm of the bell crank 1963 is connected by a link 1965 to the stop pawl 199; consequently, counter-clockwise movement of said bell crank rocks said pawl 199 also counter-clockwise out of the path of the projection of the block 196, so that the release slide 194 is free to move rearwardly to release the machine for operation.

When the traveling carriage 136 is out of columnar position, the corresponding spring 745 returns the lever 1927 and connected parts to normal positions, in which the pawl 199 is in the path of the block 196 to obstruct releasing rearward movement of the slide 194.

MODE OF OPERATION

The machine embodying the present invention has been arranged for use by banking establishments in the balancing of individual checking accounts. However, this is but a representative use of this machine, as its versatility and its many features make it easily adaptable for use in connection with many different business systems; therefore, it is not desired to limit the machine to any one business system or to any particular use in connection with such system.

The statement slip 1550 shown in Fig. 13 will be used as a basis in explaining one mode of operating the machine, said statement slip being for one individual checking account and issued in the name of John Doe in account with Any Bank and Trust Company, Anywhere. It will be noted that the statement slip is divided into a main portion and a stub portion, said portions being divided by perforations for easy separation thereof. The main portion of the statement slip 1550 is divided into the following columns: a Pick-Up column, three Check columns, a Deposit column, and a Sub-Balance column. In addition, the main portion of the statement slip contains two Date columns, one between the Pick-Up column and the first Check column, and the other between the Deposit column and the Sub-Balance column, said dates being printed in connection with the recording of the first check item and the recording of the sub-balance.

The stub portion of the statement slip 1550 contains a Float column, in which the analysis of the float is recorded; a Date column; a Total Items column; and a Balance column. The date and the total items are printed in connection with the recording of the balance in the Balance column. In the right-hand upper margin of the main portion of the statement slip 1550, definitions of the symbol keys 390 (Fig. 3), when used in connection with debit and/or credit items, are recorded.

In most banking establishments, it is the general practice to balance each active checking account daily, and the statement slips used in balancing such active accounts are usually of sufficient length to accommodate all the entries over a certain period of time, generally a month, at the end of which the stub portion of the statement slip is separated from the main portion, the main portion being mailed to the depositor and the stub portion being retained by the bank as a record.

Before beginning the daily posting of active checking accounts, the operator properly inserts a journal sheet 1595 (Fig. 8), with its superimposed carbon paper, around the platen roll 309, said journal sheet being the full width of both the main portion and the stub portion of the statement slip 1550 for the reception of a duplicate recording of every entry made on the statement slips during the day's run.

Prior to the posting of individual checking accounts, all of the active statement slips 1550 are removed from the file and placed in a convenient stack or pile near the operator, in alphabetical order. With the traveling carriage 136 (Fig. 1) in its extreme right-hand or Pick-Up columnar position and the platen roll 309 in open throat position, the operator removes the statement slip 1550 for John Doe from the top of the stack, places it in the open throat of the traveling carriage, locates the proper line of the statement slip with the printing mechanism by means of the line finding device, and then operates the electrical switch which starts the motors for the traveling carriage and the machine proper.

If this is the first entry on John Doe's statement slip, the operator ascertains the old balance of $500.00 from the last entry on the stub portion of his previous statement slip and sets up the old balance of $500.00 on the amount keys 218 (Fig. 3), depression of which amount keys, through the mechanism shown in Fig. 8, causes the platen roll 309 to be moved from open throat position to printing position.

After the amount of the old balance, $500.00, has been set up on the amount keys, operation of the machine is initiated by normal depression of the main Release bar 170, during which operation the amount of the previous or old balance is recorded in the Pick-Up column of the statement slip and is simultaneously added into the previously cleared No. 1 or balance totalizer. Normal depression of the starting bar 170 causes the traveling carriage to be tabulated from the Pick-Up column to the next column position; i. e., the first Check column at the end of machine operation. Next, the operator sets up the amount of the first check, $50.00, on the amount keys and, to identify this as a "debit memo," depresses the DM symbol key 390, after which operation of the machine is initiated by normal depression of the starting bar 170. During operation of the machine, the amount of the first check, $50.00, is recorded in red in the first Check column, with the DM symbol being simultaneously recorded immediately to the right thereof, and, at the same time, the amount of the check is subtracted from the balance of $500.00 in the balance totalizer.

At the end of the first check posting operation, the traveling carriage 136 tabulates to the second Check column, and the amount of the second check, $25.00, is set up on the amount keys and the machine is again released for operation by normal depression of the starting bar 170. During this second check operation, the amount of the check, $25.00, is subtracted from the balance totalizer and is simultaneously recorded in red in the second Check column, and, at the end of this operation, the traveling carriage again tabulates one columnar position to the third Check column.

With the traveling carriage in the third Check column position, the amount of the third check, $75.00, is set up on the amount keys, and, as there is one more debit or check item to be posted, the operator initiates operation by normal depression of the Vertical Feed bar 171. During this operation of the machine, the third check item of $75.00 is recorded in red in the third Check column and is simultaneously subtracted from the No. 1 or balance totalizer, and at the end of the operation the platen roll is rotated to line-space the record material in preparation for the entry of the fourth check item.

Next, the amount of the fourth check item, $150.00, is set up on the amount keys and the machine is released for operation by normal depression of the starting bar 170, and during this operation the amount of the fourth check item, $150.00 is recorded in red in the third Check column directly beneath the third check item and is simultaneously subtracted from the balance totalizer. Near the end of machine operation, the traveling carriage 136 tabulates to the next or Deposit column position.

The traveling carriage 136 is now in the Deposit column position, and the amount of the deposit, $100.00, is set up on the amount keys, and the machine is released for operation by normal depression of the starting bar 170. During operation of the machine, the amount of the deposit, $100.00, is recorded in black in the Deposit column of the statement slip 1550 and is simultaneously added in the balance totalizer.

Near the end of the deposit operation, the traveling carriage 136 tabulates to the next or Sub-Balance column, in which an automatic operation of the machine is initiated by said traveling carriage. In this automatic operation, the balance totalizer is sub-totalized, and the sub-balance of $300.00 is recorded in the Sub-Balance column. The sub-balance is identified as such by the symbol (*S), which is automatically printed at the time the sub-balance is printed. At the end of the sub-balance operation, the traveling carriage tabulates automatically to the Float columnar position.

As the traveling carriage moves into the Float column, the printing mechanism is automatically split into three sections for the proper entering of an analysis of the float. With the traveling carriage located in the Float column, the operator depresses the proper amount keys and initiates machine operation by normal depression of the release bar 170. Upon operation of the machine, an analysis of the float is recorded in the Float column, and, during this operation, all of the totalizers are non-added, so that the machine will function at this time only as a printing machine.

At the end of the float operation, the traveling carriage tabulates to the Balance column, and, upon arrival of said carriage in this position, the sensing mechanism initiates an automatic machine operation, during which the balance totalizer is totalized and the amount therein, $300.00, is recorded in the Balance column of the statement slip 1550, and simultaneously an identifying symbol (*) is printed directly opposite said amount to identify it as a positive balance.

During the entering of the various check and deposit items, the automatic item-counting mechanism functions to add "1" in the item totalizer each time each item is recorded. However, when the traveling carriage is in other than the Balance columnar position, the printing mechanism for the item-counting type carriers is locked against printing movement, so that the items will not be recorded, as they are automatically entered in the item totalizer. When the traveling carriage 136 is in Balance columnar position, the printing mechanism for the item type carriers is unlocked, and, during the balance operation, the item totalizer is totalized to record the total number of items (in this case five) in the Total Item column, immediately to the left of the balance.

It will be noted that, during each posting operation, the date is printed three times, twice upon the main portion of the statement slip 1550 (Fig. 13) and once upon the stub portion of said statement slip. When the traveling carriage 136 is in the first Check columnar position, the printing hammers for the date type carriers are unlocked, so that the date, April 12, '43, is printed in the Date column, immediately to the left of the first Check column, simultaneously with the posting of the first check. In a like manner, the date, April 12, '43, is printed simultaneously with the recording of the sub-balance and again with the recording of the balance.

Near the end of the balance operation, the traveling carriage 136 tabulates again to a position in which the automatic return mechanism is rendered effective to cause said carriage to be moved in a return direction to the Pick-Up column, and at the same time the platen roll 309 is moved from printing position to open throat position, so that the statement slip 1550 may be readily removed and the next statement slip inserted in the machine. In all other columnar positions of the traveling carriage, the automatic throat-opening mechanism is locked against operation to avoid unnecessary opening and closing of the front-feed throat.

In posting or balancing John Doe's checking account for April 13, 1943, the operator picks up the previous or old balance ($300.00) from the last entry in the Balance column, sets it up on the amount keys, and releases the machine for operation by depressing the starting bar 170, in exactly the same manner as explained in connection with the old balance of $500.00. The next two check items of $10.00 and $20.00 are entered in exactly the same manner as explained above, and, during the printing of the first check item of $10.00, the date, Apr 13, '43, is simultaneously printed immediately to the left of the first Check column. After the second check item of $20.00 has been entered in the machine and the traveling carriage 136 has tabulated to the third Check column, the operator sets up the amount of the third check, $30.00, on the amount keys, and, as this is a non-count item—i. e., not to be automatically accumulated in the item totalizer—the No-Count key 371 (Fig. 3) is also depressed.

Inasmuch as there is no deposit item to be posted in this particular posting, it is desired to have the traveling carriage 136 skip-tabulate from the third Check column to the Sub-Balance column, and this is effected by initiating machine operation by fully depressing the Skip Tabulating bar 172 and retaining said bar so depressed. During machine operation, the amount of the third check ($30.00) is entered in the third Check column and the symbol NC for the No-Count key 371 is simultaneously recorded immediately to the right thereof. At the end of machine operation, the traveling carriage skip-tabulates from the third Check column to the Sub-Balance column, and, in an automatic operation of the machine, the amount of the balance, $240.00, and the date, Apr 13, '43, are recorded, after which the traveling carriage tabulates to the Float column.

The figures for the float analysis are set up on the keyboard and the machine is released for operation, as explained above, and, after the analysis of the float has been recorded, the traveling carriage tabulates to the Balance column, and, in an automatic operation of the machine, the No. 1 or balance totalizer is cleared and the amount therein of the new balance ($240.00) is recorded in said Balance column. Simultaneously with the recording of the new balance, the total amount of items (2) is recorded in the Total Items column, and the date, Apr 13, '43, is also recorded in the date section of the Balance column. As in the previous posting, the traveling carriage again tabulates automatically to the left to render the mechanism effective for causing the platen roll 309 to be moved from printing position to front feeding position and to cause said traveling carriage to be automatically returned to the Pick-Up column.

In the posting of John Doe's account for April 14, 1943, the amount of the old balance ($240.00) is ascertained from the last entry in the Balance column and entered in the Pick-up column as before, after which the traveling carriage 136 tabulates to the first Check columnar position, and the first check item of $30.00 is recorded therein in the same manner as before, and, at the same time, the date is also recorded in the date section of the first Check column. Inasmuch as there are only two debit or check items to be entered at this particular posting, it is desirable that the traveling carriage tabulate directly from the first Check column to the third Check column. This is effectuated by initiating the operation in which the first check of $30.00 is recorded by full depression of the Vertical Feed release bar 171 and retention of said bar so depressed, which causes the traveling carriage to be skip-tabulated from the first Check column to the third Check column after the first check item has been recorded.

Next, the amount of the second debit item ($270.00), which in this case is twenty-five checks of a certain classification, is set up on the keyboard, and, as this is a "list debit" item, the "LS" symbol key 390, Fig. 3, is simultaneously depressed, and the number of checks (25) in this particular group is set up on the item-counting keys 343. As there is no deposit in this particular posting operation, it is desirable that the traveling carriage skip-tabulate from the third Check column to the Sub-Balance column. This is effected, as before, by full depression of the Skip Tabulating bar 172 and retention of said bar so depressed. During operation of the machine, the amount of the debit item, $270.00, is recorded in the third Check column and the symbol "LS" is simultaneously recorded immediately to the right thereof, and the total number of items (25) is simultaneously added in the item totalizer.

Subtraction of the debit item of $270.00 from the balance totalizer creates an overdraft in said totalizer, and this, through the mechanism shown in Fig. 2, sets up a condition which will cause the No. 5 or overdraft totalizer, which, it will be recalled, is always complementary to the balance totalizer, to be sub-totalized or totalized in order to secure a positive recording of the amount of the overdraft. Likewise, the occurrence of an overdraft in the balance totalizer sets up a condition which will cause the amount of the overdraft to be printed in a distinctive color.

Near the end of the operation in which the debit item of $270.00 was posted, the traveling carriage skip-tabulates from the third Check column directly to the Sub-Balance column where initiation of an automatic machine operation, is prevented by means of the previously described structure shown in Fig. 16 of the drawings. If it is desired that the sub-balance of the overdraft be printed in the Sub-Balance column, this may be accomplished by depressing the Main release bar 170 so as to cause the machine to be cycled and the sub-balance to be printed, during which the overdraft totalizer is sub-totalized and the positive amount of the overdraft ($60.00) is recorded in the Sub-Balance column. The occurrence of an overdraft in the balance totalizer likewise sets up a condition which causes the identifying symbol "OD" to be recorded immediately to the right of the sub-balance, and, as in other sub-balance operations, the sub-balance symbol "S" is recorded. Simultaneously with the recording of the sub-balance of the overdraft, the date is printed in the date section of the Sub-Balance column.

Near the end of the sub-balance operation, the traveling carriage 136 tabulates to the Float column and the analysis of the float is set up and recorded as before, after which the traveling carriage tabulates to the Balance column, and, in an automatic operation of the machine, the No. 5 or overdraft totalizer is cleared and the amount of the overdraft ($60.00) is recorded in red in the Balance column and the identifying symbol "OD" is recorded immediately to the right thereof. Simultaneously with the recording of the balance of the overdraft, the item totalizer is cleared and the total number of items (26) is cleared therefrom and recorded in the Total Items column. At the end of the balance operation, the traveling carriage 136 is returned to the Pick-Up column, and, at the same time, the platen roll 309 is moved from printing position to open throat position in preparation for the next sequence of operations.

In posting or balancing John Doe's account for April 15, 1943, the previous balance, which is an overdraft of $60.00, is set up on the amount keys 218, and machine operation is initiated by depression of the Subtract 1 or Overdraft Pick-Up key 377 (Fig. 3), and, during machine operation, the amount of the overdraft ($60.00) is subtracted from the No. 1 or balance totalizer and is simultaneously recorded in red in the Pick-Up column. Use of the key 377 to initiate machine operation causes a minus symbol (—) to be printed immediately to the right of the amount of the overdraft to further identify this as a negative amount. At the end of machine operation, the traveling carriage tabulates to the first Check columnar position, and in subsequent item-entering operations the three check items of $10.00, $5.00, and $15.00 are recorded in red and simultaneously subtracted from the balance totalizer. Before initiating the third check-entering operation, the operator notices that there is a fourth debit item, and in this case the Vertical release bar 171 is used for initiating such machine operation. Normal depression of the Vertical bar 171 causes the platen roll 309 to be rotated near the end of machine operation to line-space the record material in preparation for the listing of the fourth debit item.

The fourth item, which is a bookkeeping or service charge of fifty cents, is set up on the amount keys, and, and the same time, the "SC" symbol key 390 is depressed and the machine is released for operation by normal depression of the Release bar 170. During machine operation, the amount of the service charge, fifty cents, is recorded in red in the third check column directly beneath the third check item, and the symbol "SC" is simultaneously recorded immediately to the right thereof to identify this item as a service charge. Near the end of machine operation, the traveling carriage tabulates to the Deposit column, after which the amount of the deposit ($200.00) is set up on the amount keyboard, and, as this is a credit memo item, the "CM" symbol key 390 is simultaneously depressed, after which the Release bar 170 is depressed to initiate machine operation. During machine operation, the amount of the deposit or credit memo item is recorded in the Deposit column and is simultaneously added in the No. 1 or balance totalizer, and the symbol "CM" is simultaneously recorded immediately to the right of said credit memo item.

Near the end of the deposit operation, the traveling carriage 136 tabulates to the Sub-Balance column, and, in an automatic operation, the balance totalizer is sub-totalized and the amount therein ($109.50) is recorded in the Sub-Balance column and the symbol (*S) to identify this as a positive sub-balance item is simultaneously recorded immediately to the right thereof. At the end of the sub-balance operation, the traveling carriage 136 tabulates to the Float column, as before, and the analysis of the float is entered in the manner explained above, after which said traveling carriage tabulates to the Balance column, and, in an automatic balancing operation, the balance totalizer is cleared and the amount therein ($109.50) is recorded in the Balance column and the positive balance symbol (*) is recorded simultaneously to the right thereof. Simultaneously with the recording of the balance, the No. 6 or item totalizer is cleared and the amount of the items therein, in this case five, is simultaneously recorded in the Total Item column. Also, during the recording of the balance, the date is simultaneously recorded in the Date section of the Balance column.

It is believed that the above description of operation in connection with one particular business system will be sufficient for the purpose of the present specification. However, the many features and the versatility of the machine embodying this invention render it readily adaptable for use in connection with almost any type of business system used in connection with present-day business and manufacturing establishments. For example, the system set-up of the machine may be readily changed by the simple expedient of removing the control block bar 729 (Figs. 11A and 11B) and substituting another bar having the control blocks 722 arranged thereon to agree with the requirements of the new business system, or, if desired, the control blocks 722 may be relocated on the bar 729 to adapt the machine for a different business set-up.

The adaptability of the machine to various business systems is further enhanced by the control keys 374 to 380 inclusive (Fig. 3), the Correction keys 369 to 372 inclusive, the Column selecting keys 1066 and 1070, and the Carriage Control keys 1071, 1072, ad 1073. The adaptability of the machine to various business systems is likewise augmented by the three release bars 170, 171, and 172 and their controlling mechanism, including the slide 1808, which, it will be recalled, is positionable to four positions to vary the operation of said release keys.

While the form of mechanism herein shown and described is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described, having a traveling carriage and a main power means to operate the machine, the combination of means including a slide to render the main power means effective; a latch normally effective to hold the slide in ineffective position; an auxiliary power means; a cam; a normally disengaged clutch mechanism to connect the cam to the auxiliary power means; a linkage directly connecting the cam to the latch; and means operated by the traveling carriage when it tabulates to certain columnar positions to engage the auxiliary clutch mechanism to effect an automatic machine operation.

2. In a machine of the class described, having a traveling carriage, a main power means, and a normally disengaged main clutch mechanism to connect the main power means to the machine, the combination of means including a spring-actuated slide to engage the clutch mechanism; a latch to hold the slide in ineffective position; an auxiliary power means; a cam; a normally disengaged auxiliary clutch mechanism to connect the cam to the auxiliary power means; a linkage directly connecting the cam to the latch; and means operated by the traveling carriage when tabulated to certain columnar positions to engage the auxiliary clutch mechanism to effect an automatic operation of the machine.

3. In a machine of the class described having a traveling carriage, a main power means, and a normally disengaged main clutch mechanism to connect the main power means to the machine, the combination of means including a slide to engage the main clutch mechanism; a spring to actuate the slide; a latch to hold the slide in ineffective position against the action of the spring; an auxiliary power means; a cam; means including a normally disengaged auxiliary clutch mechanism to connect the cam to the auxiliary power means; a linkage directly connecting the cam to the latch, said linkage operable by said cam to release said latch; and means including a member actuated by the carriage when tabulated to certain columnar positions, and connections between said member and the auxiliary clutch mechanism, whereby actuation of said member engages said auxiliary clutch mechanism to effect an automatic operation of the machine.

4. In a machine of the class described having a traveling carriage, movable to various columnar positions, a main power means, and a normally disengaged main clutch to connect the main power means to the machine, the combination of a slide operatively connected to the main clutch; a spring to actuate the slide to engage the main clutch; a first latch to hold the slide against the action of the spring to maintain the main clutch disengaged; an auxiliary power means; a cam; means including a normally disengaged auxiliary clutch to connect the cam to the auxiliary power means; a first linkage directly connecting the cam to the latch, said linkage operable by said cam to release said latch; a member actuated by the traveling carriage when it is tabulated to certain columnar positions; a projection on the member; a second latch normally engaging the projection; connections between the second latch and the auxiliary clutch, whereby actuation of the member by the traveling carriage engages said auxiliary clutch to cause the cam to release the first latch to effect an automatic operation of the machine; a manipulative element; and connections between the manipulative element and the second latch, said connections effective when said element is manipulated to move the second latch out of engagement with the projection to prevent engagement of the auxiliary clutch and thereby disable automatic operation of the machine, regardless of the columnar position of the traveling carriage.

5. In a machine of the class described having a balance totalizer and a traveling carriage movable to various columnar positions, the combination of a main power means to operate the machine; a main clutch to connect the main power means to the machine; a slide connected to the main clutch; a spring to actuate the slide to engage the main clutch; a first latch lever to hold the slide against actuation by the spring to maintain the main clutch disengaged; an auxiliary power means; a cam, a normally disengaged auxiliary clutch to connect the cam to the auxiliary power means; a linkage to directly connect the cam to the latch lever; a tappet mounted on the traveling carriage in relation to a particular columnar position thereof; a lever operated by the tappet; a link operated by the lever; a projection on the link; means including a latch arm normally engaging the projection, and connections between said latch arm and the auxiliary clutch to engage said auxiliary clutch when the link is operated to connect the cam to the auxiliary power means to cause said cam to release the latch lever to initiate an automatic operation of the machine; and means operated by the balance totalizer when an overdraft occurs therein to shift the link to move the projection out of engagement with the latch arm to prevent engagement of the auxiliary clutch and thereby prevent automatic operation of the machine, regardless of the columnar position of the traveling carriage.

JOHN T. DAVIDSON.
PAUL H. WILLIAMS.
JESSE R. GANGER.
JAMES H. CRAWFORD.

REFERENCES CITED

The following references are of record in the file of this patent:

UNITED STATES PATENTS

| Number | Name | Date |
|---|---|---|
| 1,994,211 | Crosman | Mar. 12, 1935 |
| 2,086,749 | Sundstrand | July 13, 1937 |
| 2,117,620 | Mathi | May 17, 1938 |
| 2,148,760 | Lerch | Feb. 28, 1939 |
| 2,364,769 | Anderson | Dec. 12, 1944 |